US007313683B2

(12) United States Patent
Takahashi

(10) Patent No.: US 7,313,683 B2
(45) Date of Patent: Dec. 25, 2007

(54) COMPUTER SYSTEM AND METHOD WHICH BOOTS FROM A BOOTUP-MEMORY-IMAGE STORED IN NONVOLATILE MEMORY AND COPIES DATA WITHIN AN ADDRESS RANGE OF PREDETERMINED WIDTH TO MAIN MEMORY SO THAT THE SYSTEM BOOTS QUICKLY AFTER INITIALIZATION

(75) Inventor: Masahiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 365 days.

(21) Appl. No.: 10/867,648

(22) Filed: Jun. 16, 2004

(65) Prior Publication Data

US 2004/0260919 A1 Dec. 23, 2004

(30) Foreign Application Priority Data

Jun. 17, 2003 (JP) ............................. 2003-171788

(51) Int. Cl.
*G06F 13/00* (2006.01)
*G06F 9/00* (2006.01)
(52) U.S. Cl. .............................. 713/2; 713/1; 713/100; 711/170; 711/165; 711/103
(58) Field of Classification Search .................... 713/1, 713/2, 100; 717/168; 711/170, 165, 166, 711/158, 162, 202, 103, 151, 152, 163; 714/2
See application file for complete search history.

(56) References Cited

U.S. PATENT DOCUMENTS 5,388,267 A * 2/1995 Chan et al. .................. 713/2

| 6,560,703 B1 * | 5/2003 | Goodman ...................... 713/2 |
| 6,615,404 B1 * | 9/2003 | Garfunkel et al. .......... 717/173 |
| 6,954,816 B2 * | 10/2005 | Chiang et al. .............. 710/305 |
| 2005/0246518 A1 * | 11/2005 | Takahashi ...................... 713/2 |

FOREIGN PATENT DOCUMENTS

| JP | 64-035643 | 2/1989 |
| JP | 11-84533 | 7/1989 |

(Continued)

OTHER PUBLICATIONS

Japan Patent Office office action issued on Sep. 19, 2006 with English translation of relevant passages.

(Continued)

*Primary Examiner*—Hong Kim
(74) *Attorney, Agent, or Firm*—Whitham Curtis Christofferson & Cook, PC

(57) ABSTRACT

A computer system boots the system from a bootup-memory-image stored in a nonvolatile memory unit forming part of a main memory device. When the first write access occurs after system operation, the system copies the data of a block of the bootup-memory-image to a readable/writable main memory unit forming another part of the main memory device for each block of the bootup-memory image. The system performs write operation on the copy, and subsequently switches access to an area of the bootup-memory-image to which data has already been copied to access to the copy. A bootup method for a computer system and program recording medium are also disclosed.

24 Claims, 21 Drawing Sheets

FOREIGN PATENT DOCUMENTS

| | | |
|---|---|---|
| JP | 22-30350 | 9/1990 |
| JP | 03-278126 A | 12/1991 |
| JP | 04-088448 | 3/1992 |
| JP | 4-113421 | 4/1992 |
| JP | 04-211218 | 8/1992 |
| JP | 07-152641 | 6/1995 |
| JP | 9-146774 | 6/1997 |
| JP | 09-146774 A | 6/1997 |
| JP | 10-293682 A | 11/1998 |
| JP | 2001-1282542 | 10/2001 |
| JP | 2002-258971 | 9/2002 |
| JP | 07-120688 | 11/2006 |
| WO | WO 00/13210 | 3/2000 |

OTHER PUBLICATIONS

An Office Action from the Japanese Patent Office (in Japanese languages)- pp. 1-4 A translation of the Office Action from the Japanese Patent Office (in English) -pp. 1-3.

* cited by examiner

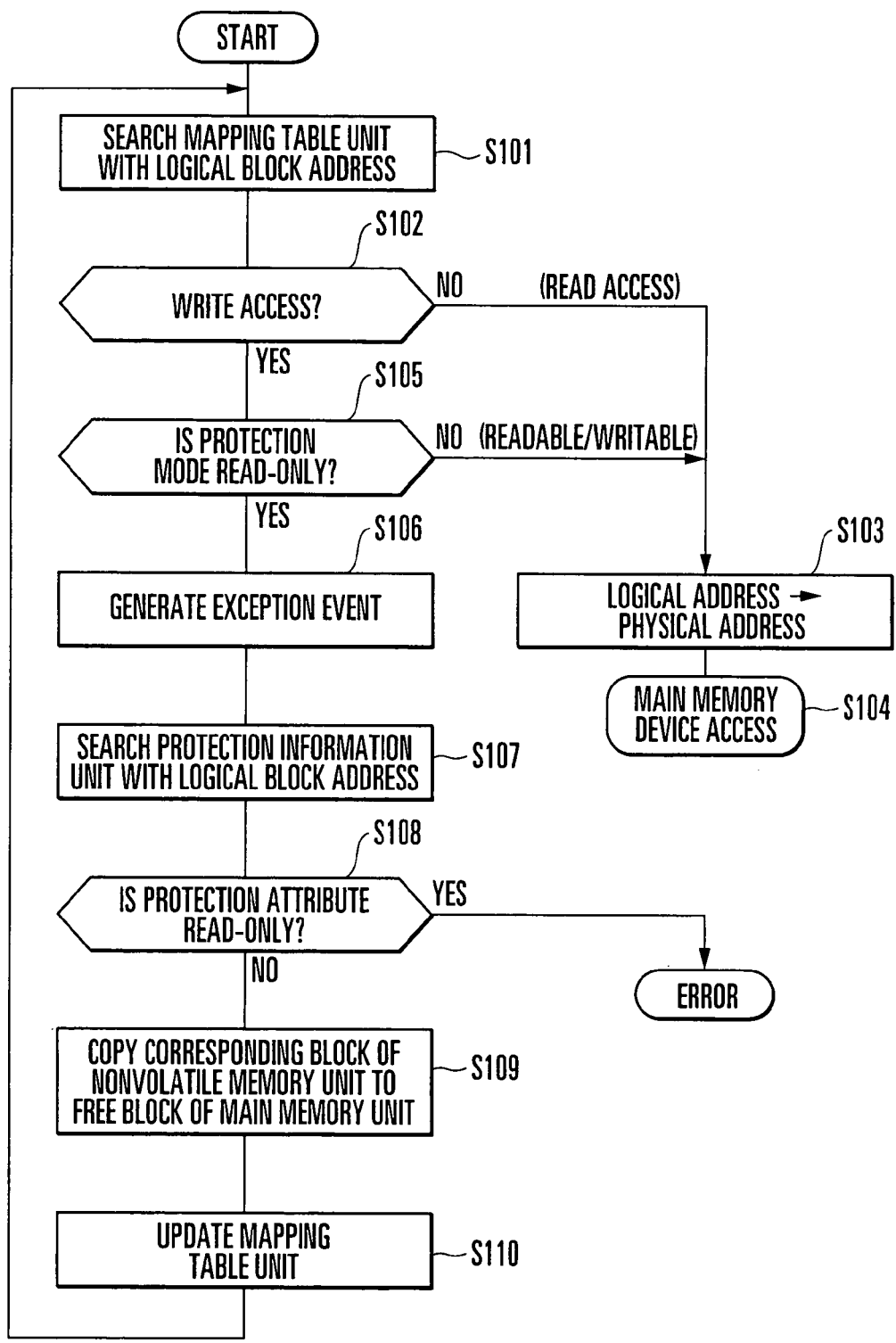
F I G. 4

| LOGICAL BLOCK ADDRESS | PROTECTION ATTRIBUTE |
|---|---|
| 0 | R |
| 1 | R |
| 2 | R |
| 3 | RW |
| 4 | RW |
| 5 | RW |
| 6 | RW |

140

R : READ-ONLY
RW : READABLE/WRITABLE

| LOGICAL BLOCK ADDRESS | PHYSICAL BLOCK ADDRESS | PROTECTION MODE |
|---|---|---|
| 0 | 1 | R |
| 1 | 2 | R |
| 2 | 3 | R |
| 3 | 4 | R |
| 4 | 5 | R |
| 5 | 6 | R |
| 6 | 7 | RW |

FIG.9A

| LOGICAL BLOCK ADDRESS | PHYSICAL BLOCK ADDRESS | PROTECTION MODE |
|---|---|---|
| 0 | 1 | R |
| 1 | 2 | R |
| 2 | 3 | R |
| 3 | 13 | RW |
| 4 | 5 | R |
| 5 | 6 | R |
| 6 | 7 | RW |

FIG.9B

| BLOCK ADDRESS | STATUS |
|---|---|
| 256 | 0 |
| ⋮ | 0 |
| 300 | 0 |
| 301 | 0 |
| ⋮ | 0 |
| 400 | 0 |
| ⋮ | 0 |
| 511 | 0 |

FIG. 21A

| BLOCK ADDRESS | STATUS |
|---|---|
| 256 | 0 |
| ⋮ | 0 |
| 300 | 0 |
| 301 | 0 |
| ⋮ | 0 |
| 400 | 1 |
| ⋮ | 0 |
| 511 | 0 |

FIG. 21B

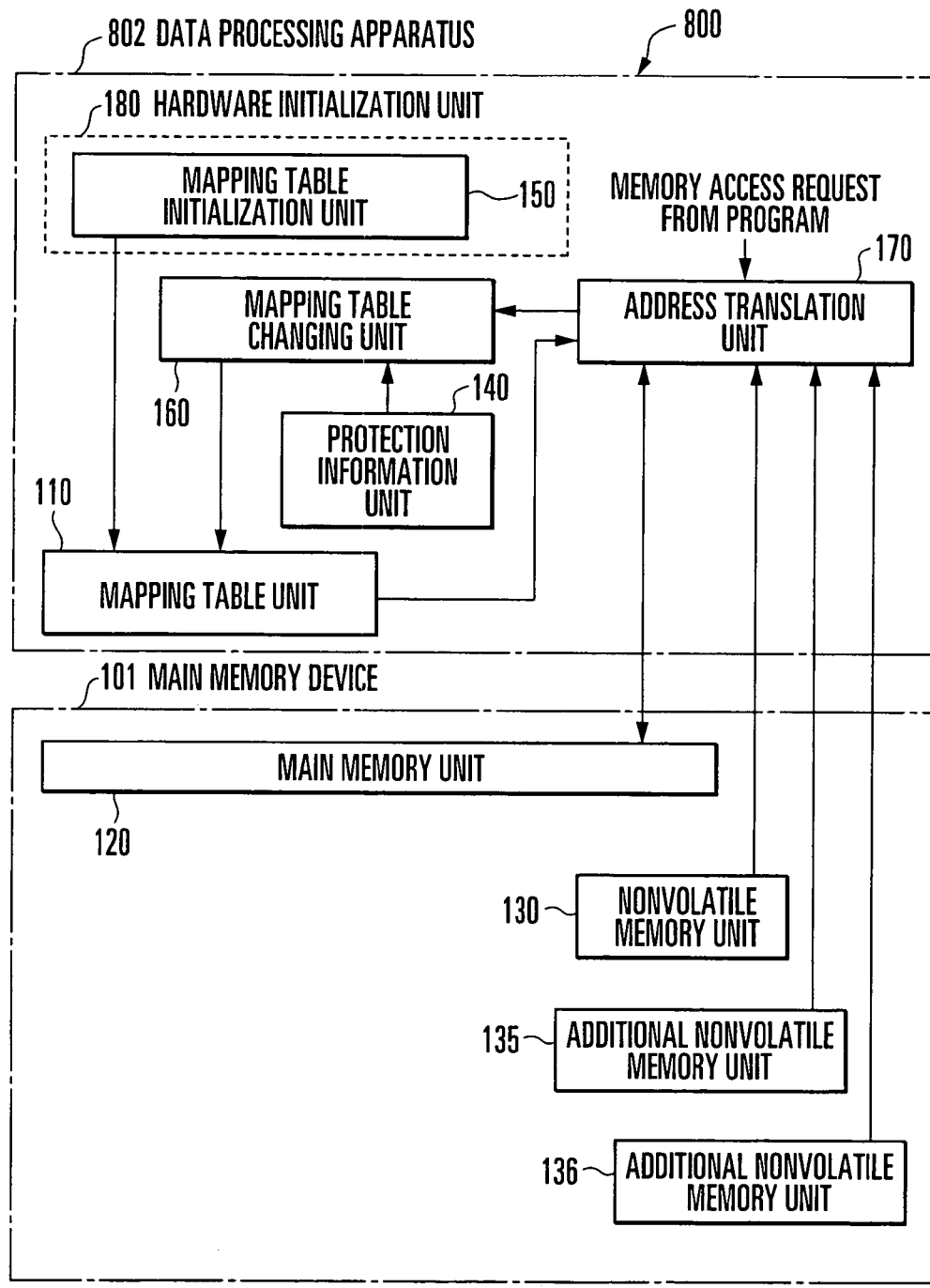
F I G. 24

| LOGICAL BLOCK ADDRESS | PHYSICAL BLOCK ADDRESS | PROTECTION MODE |
|---|---|---|
| 0 | 1 | R |
| 1 | 2 | R |
| 2 | 3 | R |
| 3 | 4 | R |
| 4 | 5 | R |
| 5 | 6 | R |
| 6 | 7 | RW |

FIG.29A

| LOGICAL BLOCK ADDRESS | PHYSICAL BLOCK ADDRESS | PROTECTION MODE |
|---|---|---|
| 0 | 1 | R |
| 1 | 20 | R |
| 2 | 30 | R |
| 3 | 21 | R |
| 4 | 31 | R |
| 5 | 6 | R |
| 6 | 7 | RW |

FIG.29B

| LOGICAL BLOCK ADDRESS | PHYSICAL BLOCK ADDRESS | PROTECTION MODE |
|---|---|---|
| 0 | 1 | R |
| 1 | 20 | R |
| 2 | 30 | R |
| 3 | 13 | RW |
| 4 | 31 | R |
| 5 | 6 | R |
| 6 | 7 | RW |

FIG.30A

| LOGICAL BLOCK ADDRESS | PHYSICAL BLOCK ADDRESS | PROTECTION MODE |
|---|---|---|
| 0 | 1 | R |
| 1 | 20 | R |
| 2 | 30 | R |
| 3 | 13 | RW |
| 4 | 31 | R |
| 5 | 12 | RW |
| 6 | 7 | RW |

FIG.30B

COMPUTER SYSTEM AND METHOD WHICH BOOTS FROM A BOOTUP-MEMORY-IMAGE STORED IN NONVOLATILE MEMORY AND COPIES DATA WITHIN AN ADDRESS RANGE OF PREDETERMINED WIDTH TO MAIN MEMORY SO THAT THE SYSTEM BOOTS QUICKLY AFTER INITIALIZATION

BACKGROUND OF THE INVENTION

The present invention relates to a computer system and, more particularly, to a computer system which can boot and reboot quickly and its bootup method.

A computer system comprises at least a CPU (Central Processing Unit), main memory, and nonvolatile memory medium. The main memory is used to hold a program to be interpreted by the CPU and a temporary processing result. The nonvolatile memory medium is a storage medium which can hold contents in the absence of power. A program is stored in this medium. A programmable nonvolatile memory medium can store data (information) which needs to be stored.

Such nonvolatile memory media include read-only type media such as a ROM and CD-ROM and writable type media such as a magnetic disk medium (hard disk, flexible disk (registered trademark), or the like), flash memory, EPROM (Erasable and Programmable ROM), and EEPROM (Electrically Erasable Programmable ROM). This programmable nonvolatile memory medium can be used as a main memory.

When the computer system is to be booted, the following processes are sequentially executed. The hardware is initialized first. An operating system (to be referred to as an OS hereinafter) is then booted. Finally, one or more necessary application programs are booted. Note the term "boot" refers to the process of starting or resetting a computer.

When the OS and application programs are to be booted, such programs are loaded from the nonvolatile memory medium. Subsequently, the initialization processing described in the program is the executed. After this initialization processing, an operation process as the intended purpose of the program can be performed.

At this time, the same operation is done every time initialization of the system is performed unless the setting or arrangement of the hardware, OS, or program is changed. Therefore, the contents of the main memory immediately after every bootup remain almost the same. In this case, the contents of the main memory can be functionally classified into a read-only program area and a data area for read/write operation. The program area is loaded from the nonvolatile memory medium and is also used for read-only operation on the main memory. The data area is temporarily used in the execution of a program and allows both read and write operations on the main memory.

The bootup time taken for this initialization processing increases with an increase in software size. Conventionally, therefore, in order to shorten the bootup time, the contents of the main memory immediately after initialization processing (to be referred to as a bootup-memory-image hereinafter) are stored in an area other than the area to be normally used, and the bootup-memory-image immediately after bootup is loaded into the main memory without any change at the time of bootup, thereby booting the system.

Such a conventional high-speed bootup technique is disclosed in Japanese Patent Laid-Open No. 03-278126 (prior art reference 1). The scheme disclosed in this reference includes a backup memory means or a disk file means for backup. A bootup-memory-image immediately after bootup is stored in the memory means or disk file means. At the time of bootup or reboot, memory copy is continuously performed from the memory means or disk file means to the main memory. When the bootup-memory-image is completely copied onto the main memory, the system can be operated. Prior art reference 1 also discloses a method of creating a bootup-memory-image immediately after bootup.

Another conventional high-speed bootup method is disclosed in Japanese Patent Laid-Open No. 10-293682 (prior art reference 2). The scheme disclosed in this reference executes reboot from a copy of the bootup-memory-image immediately after bootup which is stored in the main memory. Note, however, that immediately after reboot, memory copy is continuously performed to create a copy on the main memory again, and the system can be operated afterward.

Still another conventional high-speed bootup method is disclosed in Japanese Patent Laid-Open No. 09-146774 (prior art reference 3). According to the scheme disclosed in this reference, a main memory device is comprised of a readable/writable nonvolatile memory unit and a volatile storage unit, and system programs such as a bootup OS and other application programs are stored in the nonvolatile memory unit. Data that need to be rewritten at the time of program execution, e.g., variables and data for processing, are stored in an external storage device without being stored in the nonvolatile memory unit. When the system is to be booted, data such as variables are loaded from the external memory device into the volatile unit, and the CPU directly executes system programs such as the bootup OS from the nonvolatile memory unit, thereby booting the system.

The first problem is that memory copy of the bootup-memory-image immediately after bootup and data that need to be rewritten continuously occurs at the time of bootup, and a long halt time exists before the operation of the system can be booted for the following reasons. According to prior art reference 1, the operation of the system cannot be booted until all the bootup-memory-image immediately after bootup which is stored in the nonvolatile memory medium is copied to the main memory. According to prior art reference 2, the operation of the system cannot be booted until the bootup-memory-image immediately after bootup which is stored in the main memory for the next reboot is completely copied to be reconstructed again. According to prior art reference 3, the operation of the system cannot be booted until data that need to be rewritten are completely loaded from the external storage device into the main memory.

The second problem is that the readable/writable main memory area is wasted for the following reason. Both read-only data and read/write data on the nonvolatile memory are copied to the main memory. As a result, even the read-only data is held in the readable/writable main memory area in spite of the fact that the main memory area allows both read and write accesses. This reduces the capacity for write data.

SUMMARY OF THE INVENTION

It is an object of the present invention to provide a computer system and a method which can boot and reboot the system quickly without continuously performing memory copy at the time of bootup.

It is another object of the present invention to provide a computer system and a method which can prevent a readable/writable main memory area from being wasted.

In order to achieve the above objects, according to the present invention, there is provided a computer system which boots the system from a bootup-memory-image stored in a nonvolatile memory unit forming part of a main memory device. When first write access occurs after system operation, the system copies data of a block of the bootup-memory-image to a readable/writable main memory unit forming another part of the main memory device for each block of the bootup-memory-image. The system performs write operation on the copy, and subsequently switches access to a block of the bootup-memory-image to which data has already been copied.

BRIEF DESCRIPTION OF THE DRAWINGS

FIG. 4 is a flowchart showing the processing operations of an address translation unit and a mapping table changing unit in FIG. 1;

FIG. 7 is a view showing an example of the protection information unit in FIG. 6;

FIG. 8 is a view showing an example of the assignment of physical addresses used in the computer system in FIG. 6;

FIGS. 9A and 9B are views showing the initial state of the mapping table unit in the computer system in FIG. 6 and its state after change;

FIGS. 21A and 21B are views showing the initial state of a status table unit in FIG. 18 and its state after change;

FIG. 24 is a block diagram showing the arrangement of a computer system according to the fifth embodiment of the present invention;

FIGS. 29A and 29B are views showing the initial state of a mapping table unit in FIG. 27; and FIGS. 30A and 30B are views showing the state of the mapping table unit in FIG. 27 after change.

DESCRIPTION OF THE PREFERRED EMBODIMENTS

First Embodiment

Figure 1:
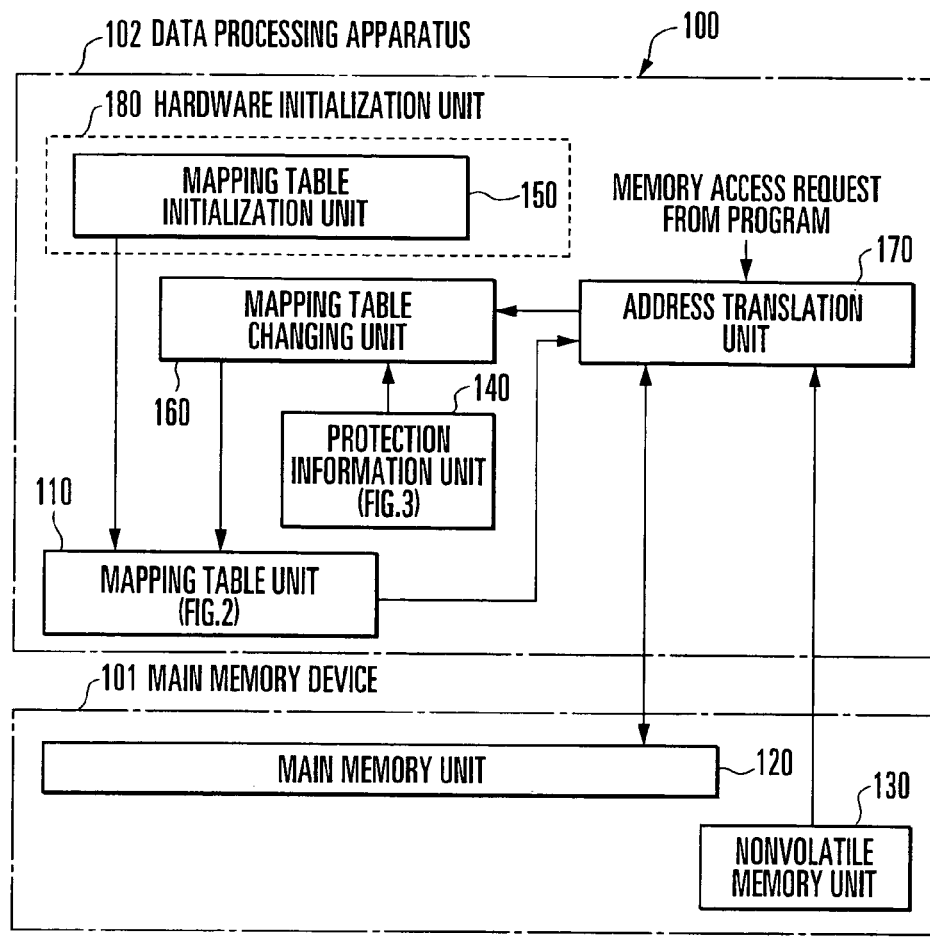
FIG. 1 is a block diagram showing the arrangement of a computer system according to the first embodiment of the present invention.

As shown FIG. 1, a computer system 100 according to the first embodiment of the present invention comprises at least a main memory device 101 and data processing apparatus 102 and operates by program control. The main memory device 101 comprises a main memory unit 120 and nonvolatile memory unit 130.

The nonvolatile memory unit 130 stores a bootup-memory-image after initialization of an OS and application programs. The nonvolatile memory unit 130 may be an arbitrary type of memory as long as it is a nonvolatile memory. For example, a read-only nonvolatile memory such as a ROM or a programmable nonvolatile memory such as a flash memory can be used. As a method of changing the contents of a bootup-memory-image, for example, a method of replacing the nonvolatile memory unit 130 with another unit can be used. If the nonvolatile memory unit 130 is programmable, a method of downloading an image file through a network or loading an image file from an external storage medium can be used.

An arbitrary method of creating a bootup-memory-image to be stored in the nonvolatile memory unit 130 can be used. For example, a bootup-memory-image can be created by dumping the memory device immediately after the computer system is booted in a usual booted way.

As the main memory unit 120, an arbitrary type of memory can be used as long as it is a readable/writable memory. In general, a volatile memory such as a DRAM or SRAM is used. A nonvolatile memory such as an MRAM (Magnetoresistive RAM), FeRAM (Ferroelectric RAM), or a flash memory can be used.

The data processing apparatus 102 also comprises a mapping table changing unit 160, address translation unit 170, and hardware initialization unit 180 as functional means. The hardware initialization unit 180 comprises a mapping table initialization unit 150. The data processing apparatus 102 comprises a mapping table unit 110 as a control table and a protection information unit 140.

The mapping table unit 110 is a control table which stores information for translating logical address into a physical address and a protection mode. The logical address is a memory address which is designated by an OS or application programs (which are generically termed a program) running on the data processing apparatus 102 when operating the main memory device 101. The physical address is a memory address which is actually assigned to the main memory unit 120 and nonvolatile memory unit 130 constituting the main memory device 101. In this case, each logical address is comprised of a logical block address and intra-block address. Each physical address is comprised of a physical block address and the intra-block address.

Figure 2:
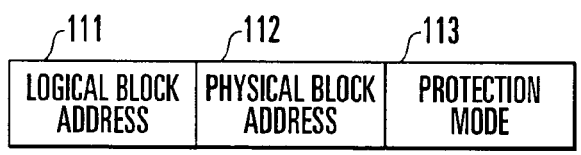
FIG. 2 is a view showing the entry arrangement of a mapping table unit in FIG. 1.

The mapping table unit 110 comprises a set of entries. Referring to FIG. 2, in one entry, a set of a logical block address 111, physical block address 112, and protection-mode 113 is held. The logical block address 111 is an address which uniquely identifies each logical block obtained by dividing a logical address space into blocks each having a predetermined size.

The physical block address 112 is an address which uniquely identifies each physical block obtained by dividing a physical address space into blocks each having the same size as that of a logical address space. Although blocks can be efficiently processed by using a block size called a page unique to architecture, the present invention is not limited to this block size.

The protection mode 113 takes either a value in a read-only protection mode or a value in a readable/writable protection mode. The protection mode 113 is a pseudo-mode different from the intrinsic protection attribute of a program executed by the computer system 100. The read-only protection mode is uniformly set for the blocks of the nonvolatile memory unit 130 at the time of system bootup.

Figure 3:
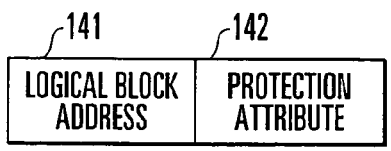
FIG. 3 is a view showing the entry arrangement of a protection information unit in FIG. 1.

The protection information unit 140 is a control table which holds the intrinsic protection attribute of a program executed by the computer system 100. The protection information unit 140 comprises a set of entries. Referring to FIG. 3, in one entry, a pair of a logical block address 141 and a protection attribute 142 is held. The protection attribute 142 takes either a read-only protection attribute or readable/writable protection attribute. Whether to set the former or the latter is determined by the intrinsic protection attribute of the block specified by the logical block address 141.

The hardware initialization unit 180 initializes the hardware of each portion of the system when the computer system 100 is booted and rebooted. In this embodiment, the hardware initialization unit 180 comprises the mapping table initialization unit 150. The mapping table initialization unit 150 has a function of assigning physical addresses to the main memory unit 120 and nonvolatile memory unit 130 and a function of initializing the mapping table unit 110. In general, owing to the function of a BIOS, physical addresses can be assigned dynamically to a given extent instead of being fixed statically with respect to devices such as a memory under the control of a PCI bus. The mapping table initialization unit 150 has a physical address assigning function similar to such processing executed by the BIOS.

Dynamic assignment of physical addresses, however, is not essential to the present invention; the present invention can be applied to a computer system in which physical addresses are statically assigned. In initializing the mapping table unit 110, the physical blocks assigned to the nonvolatile memory unit 130 are sequentially associated with the respective logical blocks constituting the logical address space, and the protection modes for all the blocks are set to the read-only protection mode regardless of the intrinsic protection attributes of the blocks.

The address translation unit 170 has a function of translating a logical address, which is designated by a program running on the computer system 100 in memory operation, into a physical address and a function of detecting an exception due to a protection mode violation and booting exception processing. Translation from a logical address to a physical address and detection of an exception due to a protection mode violation are performed by referring to the mapping table unit 110. The mapping table changing unit 160 has a function of executing the exception processing booted by the address translation unit 170. In the exception processing, the processing to be executed includes, for example, determining an intrinsic protection attribute by referring to the protection information unit 140, copying blocks of the nonvolatile memory unit 130 to the main memory unit 120, and updating the mapping table unit 110.

The processing operations of the address translation unit 170 and mapping table changing unit 160 will be described with reference to FIG. 4. The address translation unit 170 searches the mapping table unit 110 with the block address in a logical address which is designated by a program and associated with memory access, and acquires an entry with which the logical block address 111 shown in FIG. 2 coincides (step S101). The address translation unit 170 discriminates whether the memory access designated by the program is write or read access (step S102). If the access is read access (NO in step S102), the address translation unit 170 translates the logical address designated by the program into a physical address by using the physical block address 112 in the acquired entry (step S103), and accesses the main memory device 101 which is specified by the physical address (step S104).

If the memory access designated by the program is a write access (YES in step S102), the address translation unit 170 discriminates whether the protection mode 113 in the entry acquired in step S101 is the read-only protection mode or the readable/writable protection mode (step S105). If the mode is the readable/writable protection mode (NO in step S105), the address translation unit 170 translates the logical address designated by the program into a physical address by using the physical block address 112 acquired in step S101 (step S103), and accesses the main memory device 101 with address specified by the physical address (step S104).

If the protection mode 113 is the read-only protection mode (YES in step S105), the address translation unit 170 temporarily suspends the memory access processing, and boots exception processing by notifying the mapping table changing unit 160 of an exception event (step S106). In this exception event, the address translation unit 170 notifies the mapping table changing unit 160 of the logical block address 111 and physical block address 112 in the entry acquired in step S101.

The mapping table changing unit 160 searches the protection information unit 140 with the notified logical block address 111, and acquires the protection attribute 142 of an entry with which the logical block address 141 in FIG. 3 coincides (step S107). The mapping table changing unit 160 discriminates whether the protection attribute 142 is a read-only protection attribute or readable/writable protection attribute (step S108). If the attribute is a read-only protection attribute (YES in step S108), the mapping table changing unit 160 notifies the address translation unit 170 of an error. The address translation unit 170 then performs error processing such as rejecting the suspended memory access.

If the protection attribute 142 is a readable/writable protection attribute (NO in step S108), the mapping table changing unit 160 copies, to a free block of the main memory unit 120, a block of the nonvolatile memory unit 130 which is specified by the physical block address 112 notified from the address translation unit 170 (step S109). As a technique of managing to determine which blocks constituting the main memory unit 120 are free and which blocks are in use, any conventional known method, e.g., performing management by using a table holding the use state of each block of the main memory unit 120, can be used.

The mapping table changing unit 160 then retrieves, from the mapping table unit 110, an entry in which the logical block address 111 shown in FIG. 2 coincides with the logical block address notified from the address translation unit 170. Subsequently the mapping table changing unit 160 rewrites the physical block address 112 in the entry into the physical block address of a block of the main memory unit 120 as a copy destination, and rewrites the protection mode 113 into a readable/writable protection mode (step S110). The mapping table changing unit 160 then notifies the address translation unit 170 of the completion of the exception processing. Upon reception of the notification of the completion of the exception processing from the mapping table changing unit 160, the address translation unit 170 reboots the temporarily suspended memory access processing from step S101.

The operation of this embodiment will be described with reference with to FIG. 5.

When the computer system 100 is booted, the hardware initialization unit 180 initializes hardware first (step S201). The mapping table initialization unit 150 assigns physical addresses to the main memory unit 120 and nonvolatile memory unit 130, thereby initializing the mapping table unit (step S202). In initializing the mapping table unit 110, the correspondence between logical block addresses and physical block addresses is written in the mapping table unit 110, and all the blocks of the nonvolatile memory unit 130 are registered in the mapping table unit 110 in the read-only protection mode.

The data processing apparatus 102 then boots the system from the bootup-memory-image stored in the nonvolatile memory unit 130 (step S203). Since the bootup-memory-image is in the same state as that immediately after bootup of the OS and applications, the system returns to the environment set immediately after system bootup. At this time, there is no operation halt state between the instant at which the system is booted from the bootup-memory-image and the instant at which system operation is enabled (step S204).

When the first write access occurs from a program to a given block of the nonvolatile memory unit 130 at the stage of system operation (step S204), since the block is mapped in the read-only protection mode, the address translation unit 170 notifies the mapping table changing unit 160 of an exception event and temporarily suspends the write access (step S106 in FIG. 4). Upon reception of the exception event, the mapping table changing unit 160 determines the protection attribute of the block at the write occurrence logical address by referring to the protection information unit 140 (step S108 in FIG. 4). If the attribute is a readable/writable attribute, the mapping table changing unit 160 assigns a free block having the same size as the block from the main memory unit 120, and copies the contents of the corresponding block of the nonvolatile memory unit 130 to the assigned block (step S109 in FIG. 4).

The mapping table changing unit 160 further sets the assigned main memory block in the mapping table unit 110 such that the block is mapped to the write occurrence logical block address in the readable/writable protection mode, thereby rebooting the temporarily suspended write access processing (step S110 in FIG. 4). As a result, the temporarily suspended write access and subsequent write operation for the block are executed with respect to the assigned main memory block. Reducing the block size makes it possible to shorten the copy time and system operation halt time.

When the system is rebooted in this state (step S205 in FIG. 5), hardware initialization processing is executed again (step S201). As in the case of bootup, the contents of the mapping table unit 110 are initialized by the operation of the mapping table initialization unit 150, and the nonvolatile memory unit 130 is mapped again (step S202). As a consequence, the system returns to the state wherein the result of all write operations performed for the main memory unit 120 during system operation are not reflected. That is, the system returns to the environment set immediately after bootup.

This embodiment will be described in detail by giving an actual example.

Figure 6:
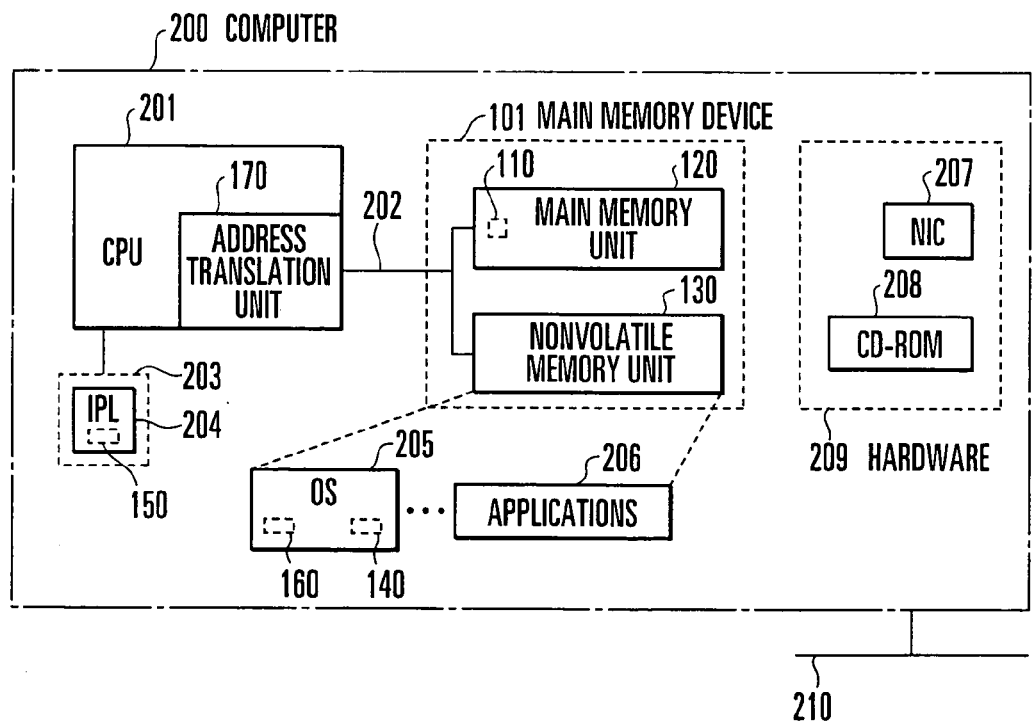
FIG. 6 is a block diagram showing an actual example of the computer system in FIG. 1.

A computer 200 in FIG. 6 is an example of the computer system to which this embodiment is applied. The main memory device 101 comprised of the main memory unit 120 and nonvolatile memory unit 130 is connected to a CPU 201 through a memory bus 202. The address translation unit 170 is accommodated in the CPU 201. The mapping table initialization unit 150 in FIG. 1 is implemented as a function of an IPL (Initial Program Loader) 204 stored in a storage device 203 connected to the CPU 201. A bootup-memory-image of an OS 205 and application programs 206 immediately after initialization processing is stored in the nonvolatile memory unit 130 in advance. The mapping table changing unit 160 in FIG. 1 is implemented as a function of the OS 205. The protection information unit 140 is also implemented as one of the control tables which the OS 205 has. In addition, the mapping table unit 110 is handled as one of the control tables created at the main memory unit 120.

Other hardware 209 connected to the CPU 201 includes a NIC (Network Interface Card) 207, CD-ROM 208, and the like. The bootup-memory-image in the nonvolatile memory unit 130 can be changed by rewriting the contents of the nonvolatile memory unit 130 upon downloading an image file through a network 210 using the NIC 207 or loading an image file from the CD-ROM 208.

In order to facilitate the understanding of the present invention, the number of blocks in an example of the protection information unit 140 shown in FIG. 7 is set to be very small. In practice, however, many blocks exist in the protection information unit 140. Referring to FIG. 7, the protection attribute of each of the blocks at logical addresses "0" to "2" is set to read-only (R), and the protection attribute of each of the blocks at logical addresses "3" to "6" is set to readable/writable (RW).

The operation of the computer 200 will be described below.

Figure 5:
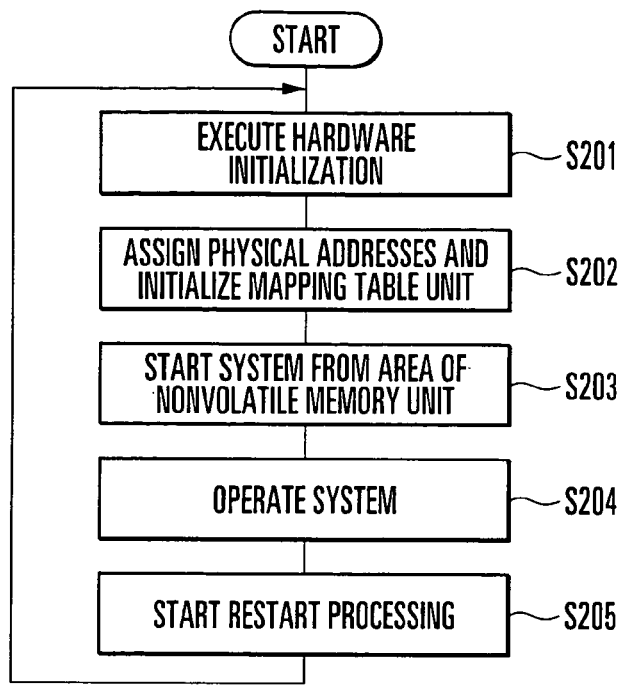
FIG. 5 is a flowchart showing the schematic operation of the computer system in FIG. 1.

When the computer 200 is booted, hardware initialization, e.g., clearing the main memory unit 120 and initializing the hardware 209, is executed first in step S201 in FIG. 5. In step S202, the mapping table initialization unit 150 implemented in the IPL 204 assigns physical addresses to the main memory unit 120 and nonvolatile memory unit 130 and initializes the mapping table unit 110.

In order to facilitate the understanding of the present invention, the numbers of blocks in an example of physical address assignment shown in FIG. 8 and an example of the initialization of the mapping table unit 110 shown in FIG. 9A are set to be very small. In practice, however, many blocks exist. Referring to FIG. 8, physical block addresses "0" to "6" are assigned to the respective blocks of the nonvolatile memory unit 130, and physical block addresses "7" and subsequent numbers are assigned to the respective blocks of the main memory unit 120.

Referring to FIG. 9A, in the initial state of the mapping table unit 110 created at the main memory unit 120, physical block addresses "1" to "6" assigned to the nonvolatile memory unit 130 are associated with logical block addresses "0" to "5", and the protection modes of all the blocks are set to read-only (R). In addition, a predetermined physical block (the block at physical block address "7" in the example) of the main memory unit 120 is associated with logical block address "6", and the corresponding protection mode is set to readable/writable (RW). In this case, the block at physical block address "7" is a block in which the mapping table unit 110 is created.

In step S203 in FIG. 5, the CPU 201 boots the system from the bootup-memory-image stored in the nonvolatile memory unit 130. More specifically, the IPL 204 sets the logical address of an instruction to be executed first in booting the operation of the system in a program counter in the CPU 201, and the operation of the system is booted by booting the execution from the instruction (step S204).

Operation to be performed when a program to be executed on the CPU 201 accesses the main memory device 101 at the stage of system operation (step S204) will be described next. Assume the following access:
(1) First write access to logical address having logical block address "3"
(2) Second or subsequent write access to logical address having logical block address "3"
(3) Read access to logical address having logical block address "1"

Operation to be performed at the occurrence of the first write access to a logical address having logical block address "3" will be described first. In this case, the address translation unit 170 searches the mapping table unit 110 with logical block address "3" to acquire an entry with "logical block address 3, physical block address 4, and protection mode R" (step S101). Since the memory access is write access (YES in step S102) and the protection mode is read-only (step S105), the address translation unit 170 temporarily suspends the memory access processing and notifies the mapping table changing unit 160 of an exception event, thereby booting exception processing (step S106).

The mapping table changing unit 160 searches the protection information unit 140 with logical block address "3" and acquires the protection attribute RW of an entry having logical block address "3" in FIG. 7 (step S107). Since the protection attribute RW is a readable/writable protection attribute (step S108), the mapping table changing unit 160 then copies a block of the nonvolatile memory unit 130 which is specified by physical block address "4" to a free block of the main memory unit 120 (the block at physical block address 13) at this point of time (step S109).

As shown in FIG. 9B, the mapping table changing unit 160 rewrites the physical block address of the entry having logical block address "3" from "4" to "13", and also rewrites the protection mode from R to RW (step S110). The mapping table changing unit 160 then notifies the address translation unit 170 of the completion of the exception processing.

Upon reception of the notification of the completion of the exception processing from the mapping table changing unit 160, the address translation unit 170 reboots the temporarily suspended memory access processing from step S101. Upon searching the mapping table unit 110 with logical block address "3", since the mapping table unit 110 is updated from the state shown in FIG. 9A to the state shown in FIG. 9B, the address translation unit 170 acquires an entry with "logical block address 3, physical block address 13, protection mode RW" (step S101).

Since the memory access designated by the program is write access (YES in step S102), and the protection mode is RW (NB in step S105), the address translation unit 170 translates the logical address designated by the program into a physical address by using physical block address "13" in the acquired entry (step S103). The address translation unit 170 then accesses the main memory device 101 which is specified by the physical address and writes the data transferred from the program in that portion of the main memory (step S104).

As described above, when the first write access occurs to a given block of the nonvolatile memory unit 130 in which the protection attribute is RW after the boot of system operation, the block is copied to the main memory unit 120 and updated on the copy.

Operation to be performed at the occurrence of the second or subsequent write access to a logical address having logical block address "3" will be described next. Upon searching the mapping table unit 110 with logical block address "3", since the mapping table unit 110 has been updated from the state shown in FIG. 9A to the state shown in FIG. 9B, the address translation unit 170 acquires an entry with "logical block address 3, physical block address 13, protection mode RW" (step S101).

Since the memory access designated by the program is write access (YES in step S102) and the protection mode is RW (NO in step S105), the address translation unit 170 translates the logical address designated by the program into a physical address by using physical block address "13" in the acquired entry (step S103). The address translation unit 170 then accesses the main memory device 101 which is specified by the physical address and writes the data transferred from the program (step S104).

As described above, when the second or subsequence write access occurs to a given block of the nonvolatile memory unit 130 in which the protection attribute is RW after the boot of system operation, since copy operation like that for the first write access need not be performed immediately, a copy existing on the main memory unit 120 is immediately updated.

Operation to be performed at the occurrence of read access to a logical address having logical block address "1" will be described next. The address translation unit 170 searches the mapping table unit 110 with logical block address "1" designated by the program to acquire an entry with "logical block address 1, physical block address 2, protection mode R" (step S101). Since the memory access designated by the program is read access (NO in step S102), the address translation unit 170 translates the logical address designated by the program into a physical address by using physical block address "2" in the acquired entry (step S103). The address translation unit 170 then accesses the main memory device 101 which is specified by the physical address and returns read data to the program (step S104).

As described above, when making read access to the nonvolatile memory unit 130, the address translation unit 170 directly reads out data from the nonvolatile memory unit 130.

Second Embodiment

Figure 10:
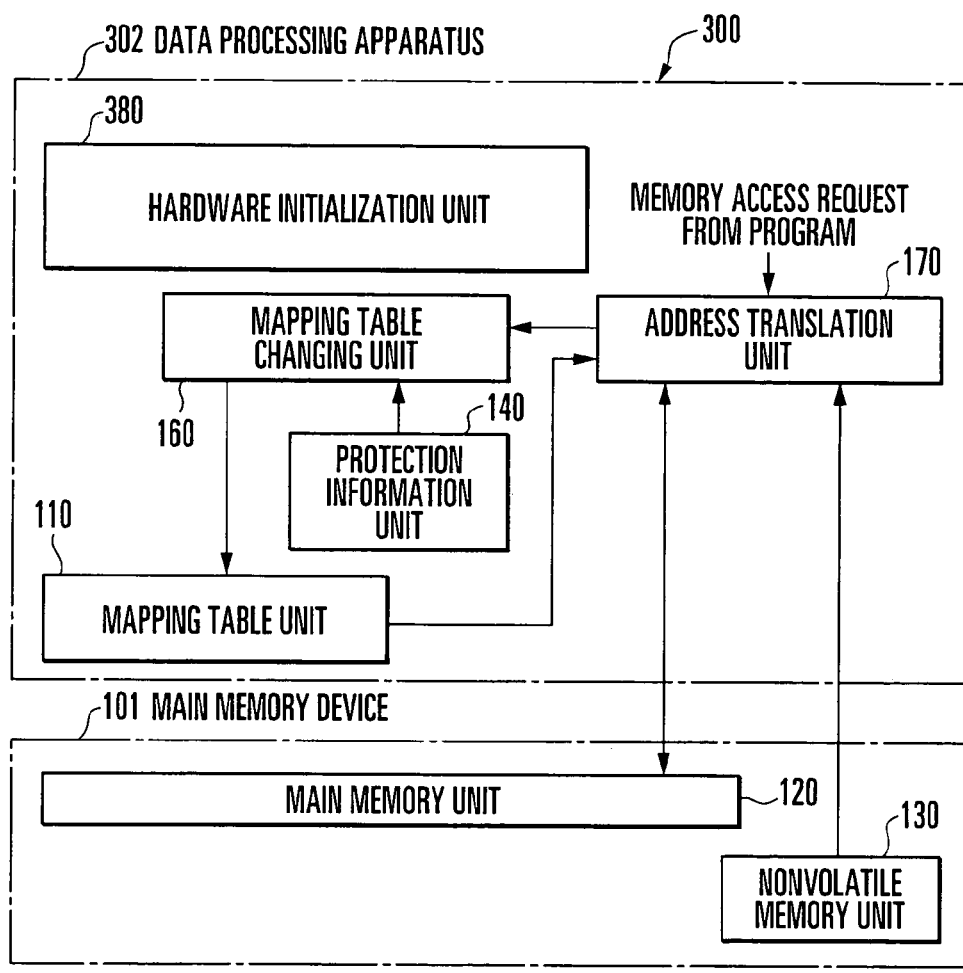
FIG. 10 is a block diagram showing the arrangement of a computer system according to the second embodiment of the present invention.

As shown in FIG. 10, a computer system 300 according to the second embodiment of the present invention differs from that according to the first embodiment in that a hardware initialization unit 380 of a data processing apparatus 302 has no mapping table initialization unit, and uses an initialized mapping table unit 110. In the computer system 100 according to the first embodiment shown in FIG. 1, if the arrangements of hardware and software remain unchanged, the state of assignment of physical addresses and the initialized state of the mapping table unit 110 always remain the same. The second embodiment focuses attention to this point and further simplifies the processing required for system bootup by using the mapping table unit 110 which has already been initialized.

Figure 11:
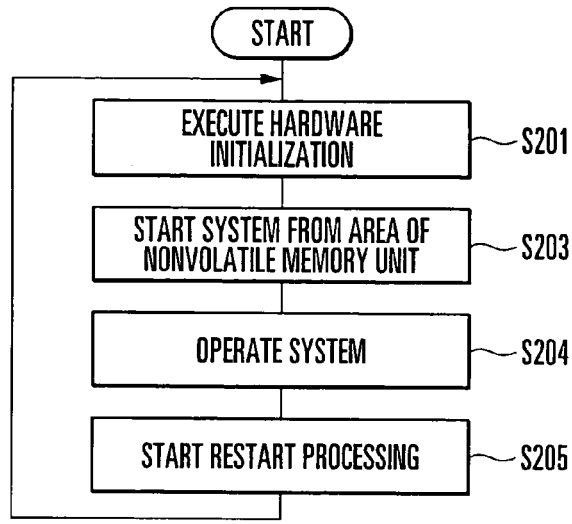
FIG. 11 is a flowchart showing the schematic operation of the computer system in FIG. 10.

FIG. 11 shows the operation of the computer system 300. The processing of assigning physical addresses and initializing the mapping table unit 110 (step S202 in FIG. 5) is omitted unlike the operation flowchart in the first embodiment shown in FIG. 5. Other arrangements and operations are the same as those in the first embodiment.

This embodiment will be described in detail next by giving an actual example.

Figure 12:
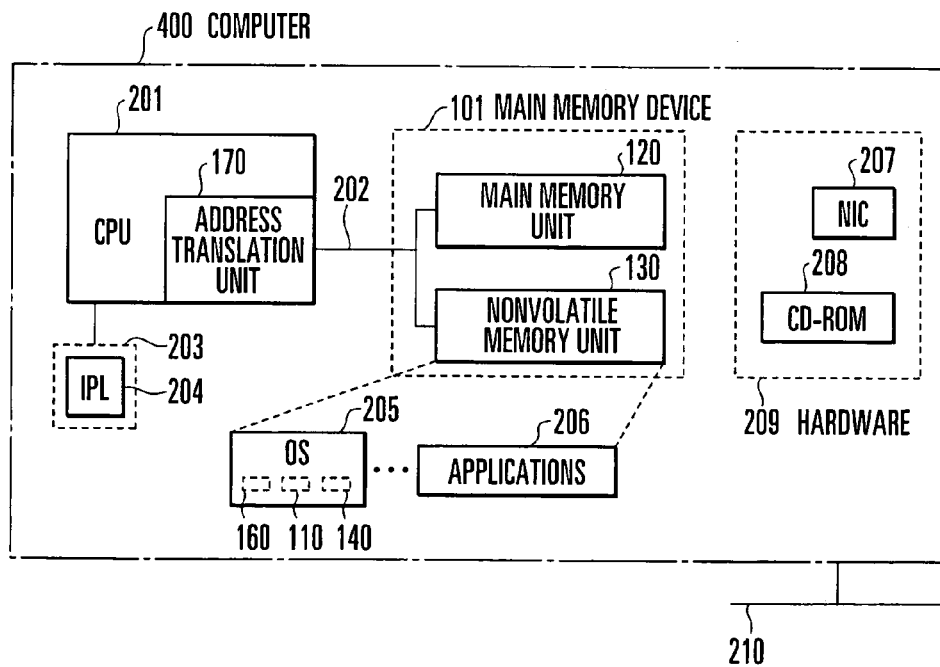
FIG. 12 is a block diagram showing an actual example of the computer system in FIG. 10.

A computer 400 in FIG. 12 is an example of a computer system to which this embodiment is applied. The computer 400 differs from the computer 200 in FIG. 6 in that it has the initialized mapping table unit 110 as one of the control tables in an OS 205.

The operation of the computer 400 will be described below.

When booted, the computer 400 executes initialization of hardware in step S201 in FIG. 11, e.g., clearing a main memory unit 120 and initializing hardware 209. Unlike in the actual example of the first embodiment, the computer 400 uses physical addresses which have been statically set in advance without dynamically assigning physical addresses to a main memory unit 120 and nonvolatile memory unit 130. The computer 400 does not initialize the mapping table unit 110 either. If, for example, the statically set physical addresses are those shown in FIG. 8, the initialized state of the mapping table unit 110 coincides with the contents shown in FIG. 9A.

More specifically, physical block addresses "1" to "6" assigned to the nonvolatile memory unit 130 are associated with logical block addresses "0" to "5", and the protection modes of all the blocks are set to read-only (R). Referring to FIG. 9A, a predetermined physical block of the main memory unit 120 is associated with logical block address "6", and the protection mode is set to readable/writable (RW). However, this is not always required in this embodiment.

In step S203 in FIG. 11, as in the actual example of the first embodiment, a CPU 201 boots the system from the bootup-memory-image stored in the nonvolatile memory unit 130. When a program executed on the CPU 201 accesses a main memory device 101 at the stage of system operation (step S204), the processing shown in FIG. 4 is executed as in the actual example of the first embodiment. With this operation, when the first write access occurs to a given block of the nonvolatile memory unit 130 in which the protection attribute is RW after the boot of system operation, the block is copied to the main memory unit 120, and updating is performed on the copy.

When the second or subsequent write access occurs to a given block of the nonvolatile memory unit 130 in which the protection attribute is RW, the copy existing on the main memory unit 120 is immediately updated. When read access is made to the nonvolatile memory unit 130, data is directly read out from the nonvolatile memory unit 130. In this actual example, since the mapping table unit 110 is stored in the nonvolatile memory unit 130, when step S110 in FIG. 4 is executed for the first time after system operation, a block containing the mapping table unit 110 is copied to a free block of the main memory unit 120, and updating is performed on the copy.

Third Embodiment

In the first embodiment, the address translation unit 170 translates a logical address into a physical address. Every time a program makes write access to the nonvolatile memory unit 130 during system operation, the address translation unit 170 performs the copy and translation operations. The address translation unit 170 copies data within an address range having a predetermined width and containing a logical address at which the write access has occurred from the nonvolatile memory unit 130 to a free block of the main memory unit 120. The address translation unit 170 translates subsequent access to the address range having the predetermined width into access to the corresponding block of the main memory unit 120.

In this embodiment, a memory access unit receives a physical address associated with memory access and controls memory access. Every time a program makes write access to a nonvolatile memory unit 130 during system operation, a memory access unit performs copy and switching operations. The memory access unit copies data within an address range having a predetermined width and containing a logical address at which the write access has occurred from the nonvolatile memory unit 130 to a free block of a main memory unit 120. The memory access unit switches subsequent access to the physical address range having the predetermined width to access to the corresponding block of the main memory unit 120.

Figure 13:
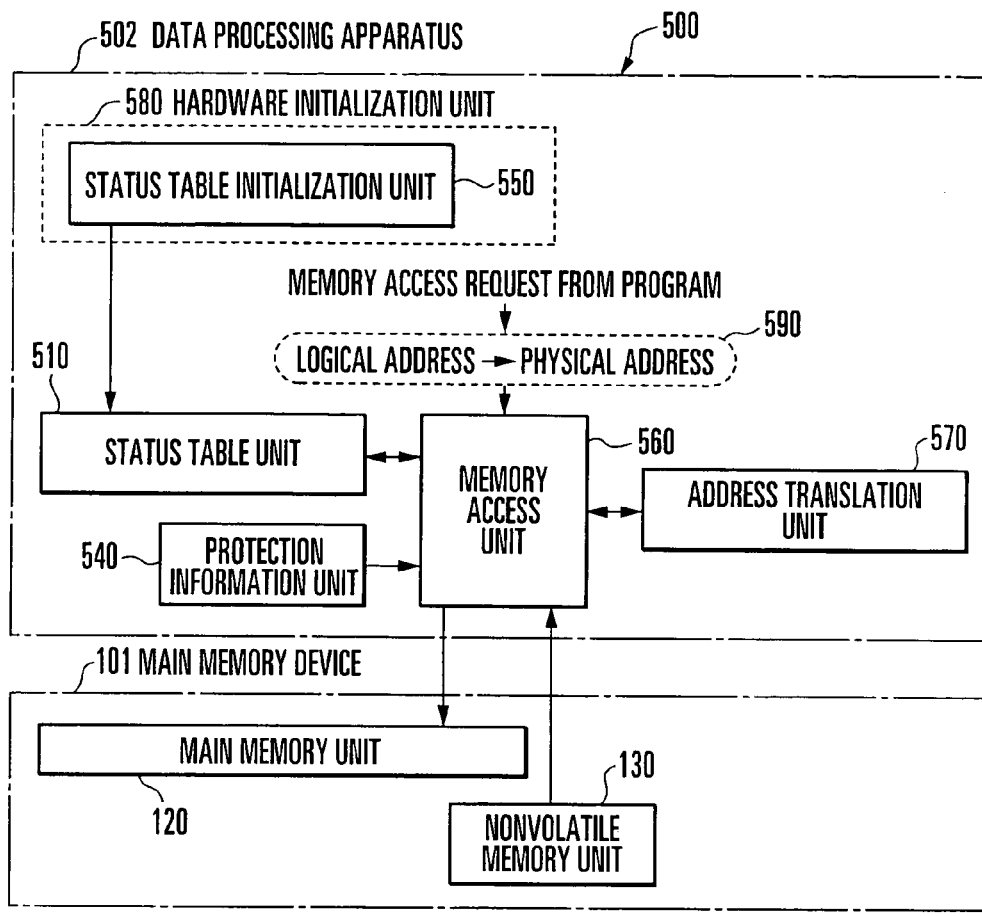
FIG. 13 is a block diagram showing the arrangement of a computer system according to the third embodiment of the present invention.

As shown in FIG. 13, a computer system 500 according to the third embodiment of the present invention comprises at least a main memory device 101 and data processing apparatus 502, and operates by program control.

The main memory device 101 comprises the main memory unit 120 and nonvolatile memory unit 130 similar to those in the first embodiment. That is, the nonvolatile memory unit 130 stores a bootup-memory-image of an OS and application programs.

The data processing apparatus 502 comprises a memory access unit 560, address translation unit 570, and hardware initialization unit 580. The hardware initialization unit 580 comprises a status table initialization unit 550. The data processing apparatus 502 comprises a status table unit 510 as a control table and protection information unit 540.

Figure 14:
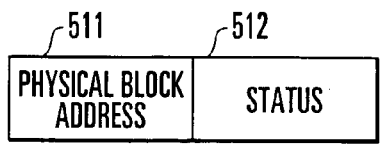
FIG. 14 is a view showing the entry arrangement of a status table unit in FIG. 13.

The status table unit 510 is a table which holds a status, for each block of the nonvolatile memory unit 130, which indicates whether the block is completely copied to the main memory unit 120. The status table unit 510 is formed from a set of entries. Referring to FIG. 14, in one entry, a pair of a physical block address 511 and a status 512 is held. When the block at the physical block address 511 has already been copied to the main memory unit 120, the status 512 is set to logical value 1; otherwise, the status 512 is set to logical value 0.

Figure 15:
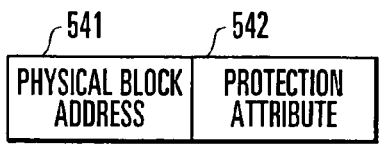
FIG. 15 is a view showing the entry arrangement of a protection information unit in FIG. 13.

The protection information unit 540 is a table which holds the protection attribute of each block of the nonvolatile memory unit 130. FIG. 15 shows an example of the arrangement of an entry of the protection information unit 540. The protection information unit 540 is formed from a set of such entries. Referring to FIG. 15, in one entry, a pair of a physical block address 541 and a protection attribute 542 is held. The protection attribute 542 takes either a read-only protection attribute or a readable/writable protection attribute. Whether to set the former or the latter is determined by the intrinsic protection attribute of a block of the nonvolatile memory unit 130 which is specified by the logical block address 541.

The hardware initialization unit 580 initializes the hardware of each portion of the system when the computer system 500 is booted and rebooted. In this embodiment, the hardware initialization unit 580 comprises the status table initialization unit 550. The status table initialization unit 550 has a function of assigning physical addresses to the main memory unit 120 and nonvolatile memory unit 130 constituting the main memory device 101 and a function of initializing the status table unit 510.

Dynamic assignment of physical addresses, however, is not essential to the present invention; the present invention can be applied to a computer system in which physical addresses are statically assigned. In initializing the status table unit 510, a status represented by logic value 0 indicating copy incomplete is set for each physical block assigned to the nonvolatile memory unit 130.

The address translation unit 570 translates a physical address of the nonvolatile memory unit 130 into a physical address in a block of the main memory unit 120 to which a physical block containing the physical address is copied. Translation between physical addresses is performed by using a correspondence table of physical block addresses before and after translation. In addition, this translation can be realized in the following manner. As will be described below in an actual example of this embodiment, each physical address assigned to the nonvolatile memory unit 130 is related to the physical address of a block reserved in the main memory unit 120 as a corresponding copy area such that they are separated from each other by a predetermined address distance. This makes it possible to realize the translation by changing the values of some bits of a bit string representing a physical address into values determined by the address distance.

The memory access unit 560 accesses the main memory device 101 in accordance with a memory access request from a program running on the computer system 500. As shown in FIG. 13, if the computer system 500 has a function 590 of translating the logical address designated by a program in memory operation into a physical address, the memory access unit 560 inputs a memory access request containing the address information obtained by translation to a physical address. If the computer system 500 does not have the function 590 and a logical address is identical to a physical address, the memory access unit 560 inputs a memory access request containing the address information output from a program without any change.

The memory access unit 560 includes a function of copying a block to an access destination block of the main memory unit 120, if needed, with respect to a memory access request to the nonvolatile memory unit 130 by referring to the status table unit 510 and protection information unit 540, and a function of performing translation to a physical address by using the address translation unit 570 and accessing the copy destination block of the main memory unit 120 instead of the nonvolatile memory unit 130.

The processing operations of the memory access unit 560 and address translation unit 570 will be described with reference to FIG. 16. The memory access unit 560 searches the status table unit 510 with the block address in a physical address associated with memory access, and acquires an entry containing the physical block address 511 shown in FIG. 14 which coincides with the physical address (step S301). Depending on whether a corresponding entry exists, the memory access unit 560 then discriminates whether the current memory access is access to the nonvolatile memory unit 130 (step S302). If the access is access to the main memory unit 120 other than the nonvolatile memory unit 130 (NO in step S302), the memory access unit 560 does not perform translation to a physical address, and accesses the main memory unit 120 with address specified by the input physical address (step S303).

If the current memory access is access to the nonvolatile memory unit 130 (YES in step S302), the memory access unit 560 discriminates whether the status 512 in the entry acquired in step S301 is "0" (copy incomplete) or "1" (copy complete) (step S304). If the status 512 is "1" (copy complete) (NO in step S304), the memory access unit 560 translates the input physical address into a copy destination physical address (step S305), and accesses the main memory unit 120 which is specified by the physical address after translation (step S303).

If the status 512 is "0" (copy incomplete) (YES in step S304), the memory access unit 560 discriminates whether the current memory access is write or read access (step S306). If the access is read access (NO in step S306), the memory access unit 560 accesses the nonvolatile memory unit 130 with address specified by the input physical address, without translating the physical address (step S303).

If the access is read access (YES in step S306), the memory access unit 560 searches the protection information unit 540 with the block address in the physical address associated with the memory access, and acquires the protection attribute 542 of an entry with which the physical block address 541 shown in FIG. 15 coincides (step S307). The memory access unit 560 then discriminates whether the protection attribute is read-only or readable/writable (step S308). If the protection attribute is read-only (YES in step S308), the memory access unit 560 performs error processing, e.g., rejecting the current memory access as a protection attribute violation.

If the protection attribute 542 is a readable/writable protection attribute (NO in step S308), the memory access unit 560 copies a block of the nonvolatile memory unit 130 which is specified by the physical block address for memory access to a free block of the main memory unit 120 (step S309). The memory access unit 560 then retrieves, from the status table unit 510, an entry in which the physical block address 511 in FIG. 14 coincides with the input physical block address, and rewrites the status 512 of the entry into "1" indicating "copy complete" (step S310). The memory access unit 560 then executes the current memory access processing from step S305 again. Note that the same effect can be obtained even by executing the current memory access processing from step S301 instead of step S305.

The operation of this embodiment will be described below with reference to FIG. 17.

Figure 17:
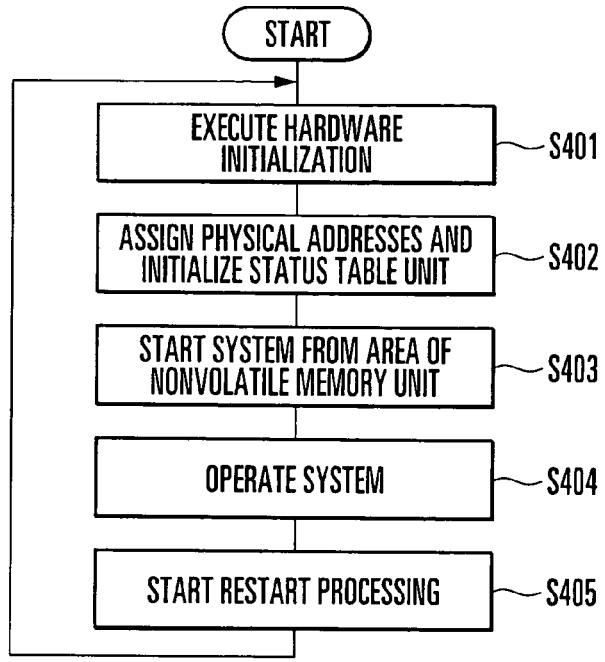
FIG. 17 is a flowchart showing the schematic operation of the computer system in FIG. 13.

As shown in FIG. 17, when the computer system 500 is booted, the hardware initialization unit 580 initializes the hardware first (step S401). The status table initialization unit 550 then assigns physical addresses to the main memory unit 120 and nonvolatile memory unit 130 and initializes the status table unit 510 (step S402). In initialization of the status table unit 510, the physical block addresses of all the blocks of the nonvolatile memory unit 130 and the status represented by logic value 0 are registered in the status table unit 510.

The data processing apparatus 502 boots the system from the bootup-memory-image stored in the nonvolatile memory unit 130 (step S403). Since this bootup-memory-image is in the same state as that set immediately after the bootup of the OS and the applications, the system returns to the environment set immediately after bootup. At this time, there is no operation halt state between the instant at which the system is booted from the bootup-memory-image and the instant at which system operation is enabled (step S404).

Figure 16:
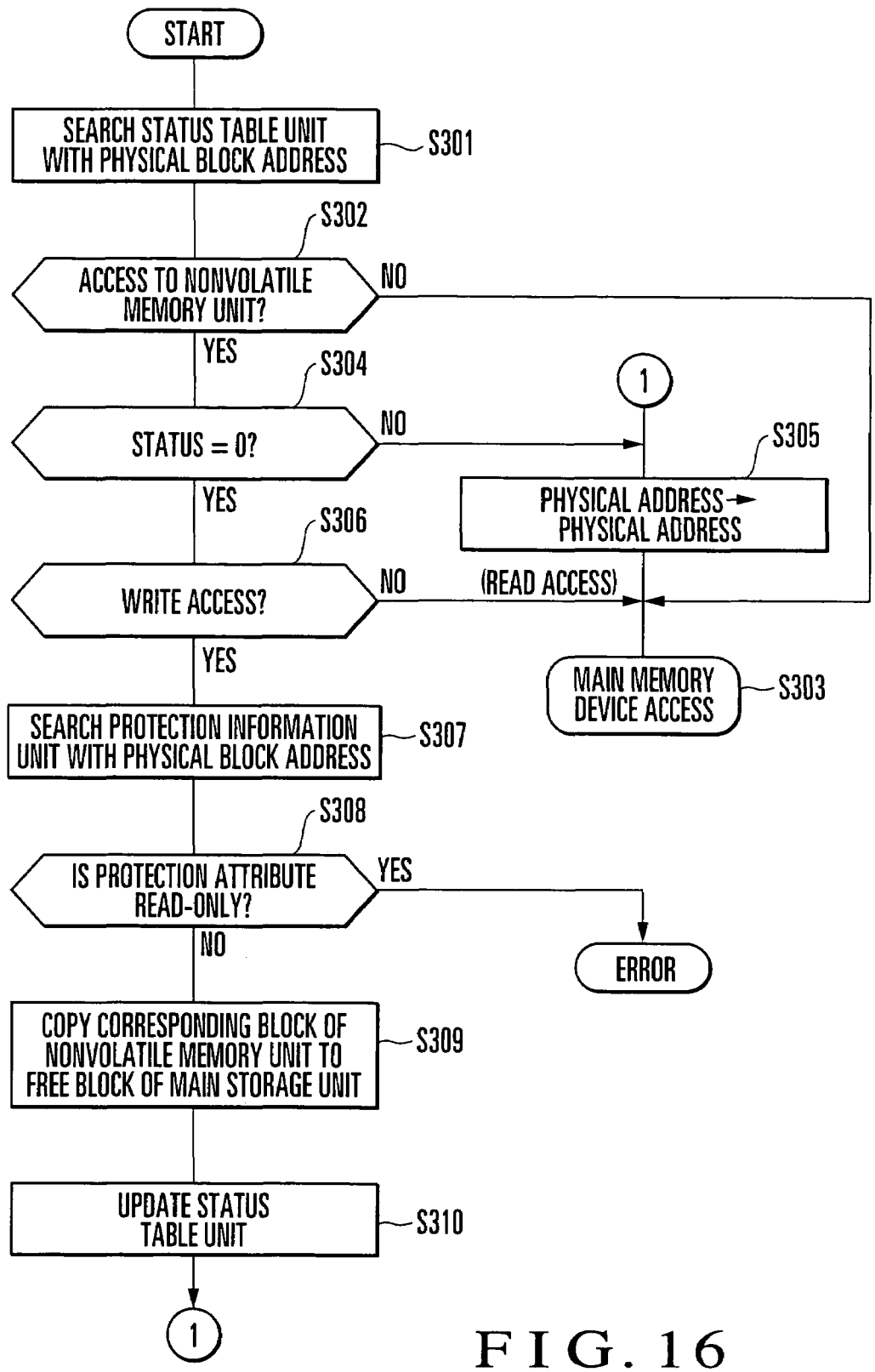
FIG. 16 is a flowchart showing the processing operation of a memory access unit in FIG. 13.

When the first write access occurs from the program to a given block of the nonvolatile memory unit 130 at the stage of system operation (step S404), since the status of the block of the status table unit 510 has been initialized to "0" (copy incomplete), the memory access unit 560 determines the protection attribute of the block containing the write occurrence physical address by referring to the protection information unit 540 (step S308 in FIG. 16).

If the protection attribute is a readable/writable attribute, the contents of the block of the nonvolatile memory unit 130 are copied to a free block of the main memory unit 120 (step S309 in FIG. 16), and the status of the block of the status table unit 510 is rewritten into logic value "1" indicating "copy complete" (step S310 in FIG. 16), thereby rebooting the write access processing. As a result, in the current write access and subsequent write access to the block, the physical address in the nonvolatile memory unit 130 is translated into a physical address in the main memory unit 120 as a copy destination (step S305 in FIG. 16), and the copy on the main memory unit 120 is updated.

When reboot processing is performed in this state (step S405 in FIG. 17), hardware initialization processing is executed first again (step S401), and the contents of the status table unit 510 are initialized by the operation of the status table initialization unit 550 as in the case of bootup processing. As a consequence, the system returns to the state wherein the result of all write operations performed for the main memory unit 120 during system operation are not reflected. That is, the system returns to the environment set immediately after bootup.

This embodiment will be described in detail by giving an actual example.

Figure 18:
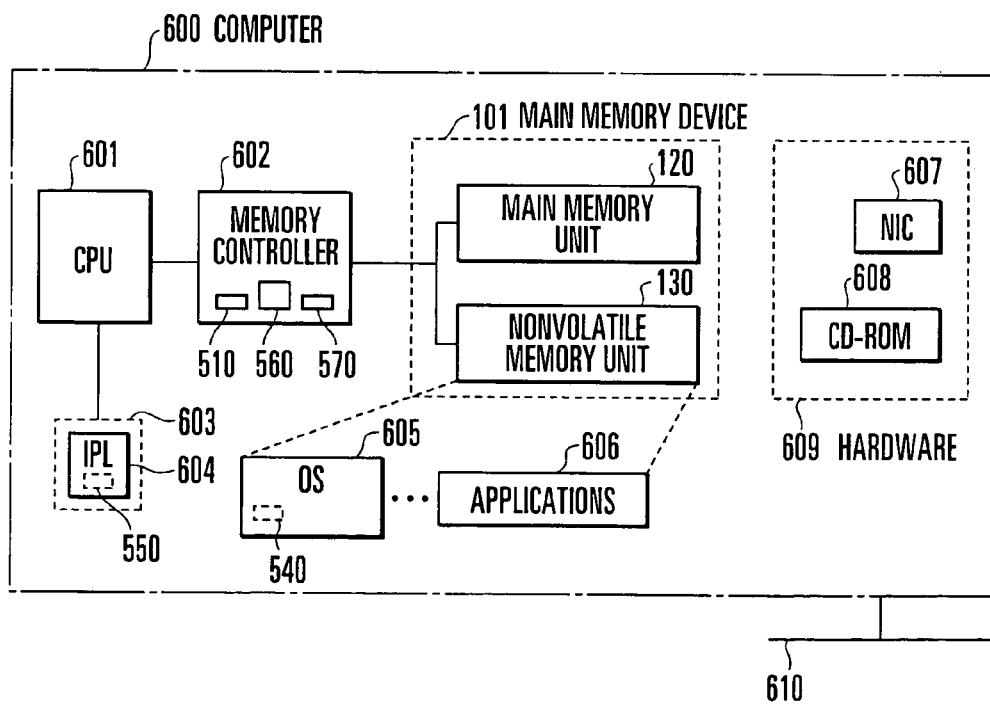
FIG. 18 is a block diagram showing an actual example of the computer system in FIG. 13.

A computer 600 in FIG. 18 is an example of the computer system to which this embodiment is applied. The main memory device 101 comprised of the main memory unit 120 and nonvolatile memory unit 130 is connected to a CPU 601 through a memory controller 602. The status table unit 510, memory access unit 560, and address translation unit 570 are implemented in the memory controller 602. The status table initialization unit 550 in FIG. 18 is implemented as a function of an IPL 604 stored in a storage device 603 connected to the CPU 601.

A bootup-memory-image processing of an OS 605 and application programs 606 is stored in the nonvolatile memory unit 130 in advance. The protection information unit 540 in FIG. 18 is implemented as one of the control tables which the OS 605 has. In this embodiment, since the CPU 601 includes no means for translating logical addresses into physical addresses, logical addresses are identical to physical addresses. However, the present invention can also be applied to a case wherein the CPU 601 includes a means for translating logical addresses into physical addresses.

Other hardware 609 connected to the CPU 601 includes a NIC (Network Interface Card) 607, CD-ROM 608, and the like. The bootup-memory-image in the nonvolatile memory unit 130 can be changed by rewriting the contents of the nonvolatile memory unit 130 upon downloading an image file through a network 610 using the NIC 607 or loading an image file from the CD-ROM 608.

Figure 19:
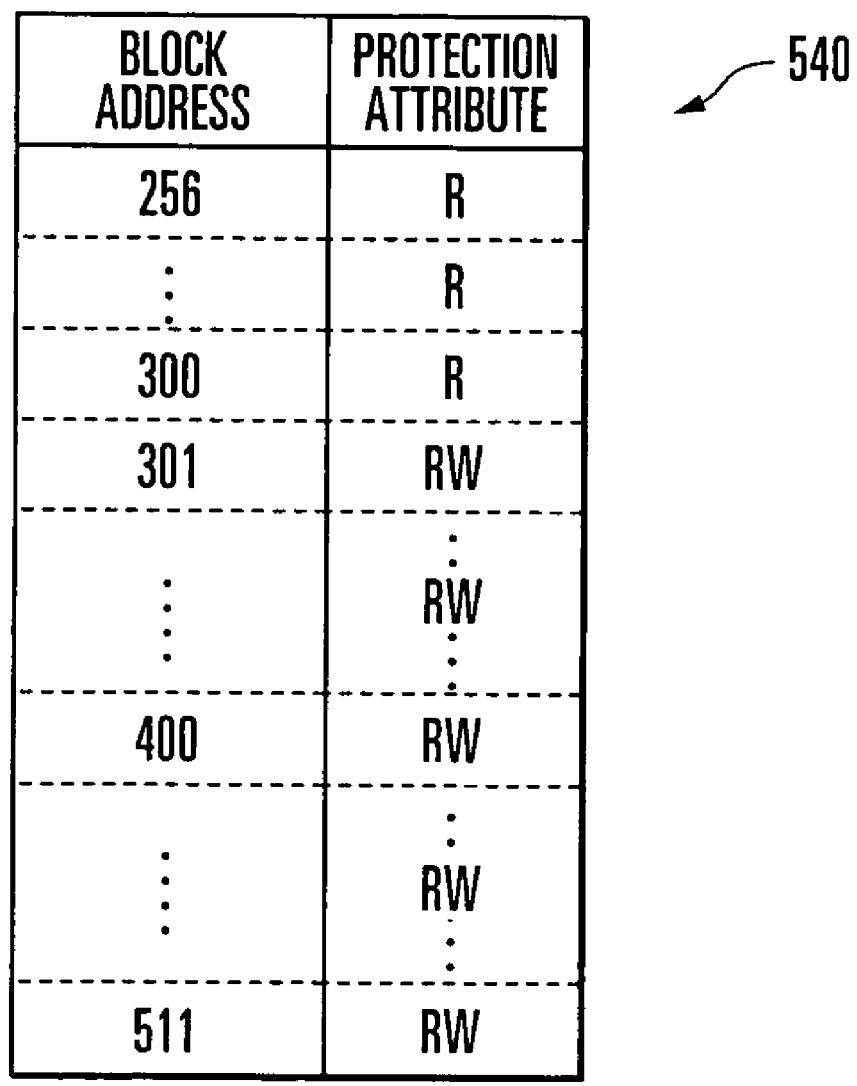
FIG. 19 is a view showing an example of a protection information unit in FIG. 18.

Referring to FIG. 19, in the protection information unit 540, a read-only (R) protection attribute is assigned to each of blocks at block addresses "256" to "300", of a plurality of blocks at block addresses "256" to "511" which constitute the nonvolatile memory unit 130, and a readable/writable (RW) protection attribute is assigned to each of blocks at remaining block addresses "301" to "511". In this case, since logical addresses are identical to physical addresses, block addresses mean logical block addresses and physical block addresses.

The operation of the computer 600 will be described below.

When the computer 600 is booted, hardware initialization, e.g., clearing the main memory unit 120 and initializing the memory controller 602 and hardware 609, is executed in step S401 in FIG. 17. In step S402, the status table initialization unit 550 implemented in the IPL 604 assigns physical addresses to the main memory unit 120 and nonvolatile memory unit 130, and initializes the status table unit 510 in the memory controller 602.

Figure 20:
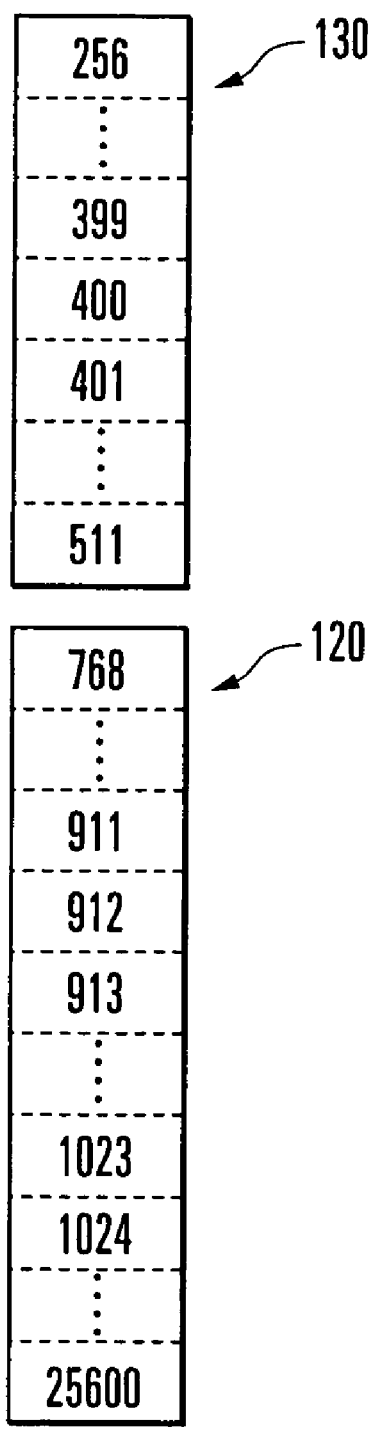
FIG. 20 is a view showing an example of the assignment of physical addresses used in the computer system in FIG. 18.

Referring to FIG. 20, physical block addresses "256" to "511" are assigned to the respective blocks of the nonvolatile memory unit 130, and physical block addresses "768" to "25600" are assigned to the respective blocks of the main memory unit 120. In this case, the areas at physical block addresses "768" to "1023" of the blocks of the main memory unit 120 which are continuous areas equal in number to the blocks of the nonvolatile memory unit 130 are reserved as areas to which the blocks of the nonvolatile memory unit 130 are to be copied. The blocks at physical block address "1024" and subsequent addresses are main memory areas which are not reserved. Such physical address assignment and copy area selection are performed to simplify translation between physical addresses in the address translation unit 570. This point will be described below.

In this example, the size of one block is set to 4,096 bytes. Therefore, physical addresses in the nonvolatile memory unit 130 are expressed as "0x1000000" to "0x1FFFFF" in hexadecimal notation, and the physical addresses of the reserved areas as copy areas are expressed as "0x3000000" to "0x3FFFFF". As a copy destination of a block of the nonvolatile memory unit 130 which is located at physical block address "256", a block at physical block address "768" which is a reserved area is used; as a copy destination of a block at physical block address "257", a block at physical block address "769"; . . . , and as a copy destination of a block at physical block address "511", a block at physical block address "1023".

As a consequence, the physical address of a given block of the nonvolatile memory unit 130 differs from the physical address of a copy destination block as a reserved area in that the lower sixth bits of the two addresses become "1" and "3" in hexadecimal notation, respectively, and the lower 22nd bits of the two addresses become "0" and "1" in binary notation. Therefore, a physical address belonging to a given block of the nonvolatile memory unit 130 can be translated into a physical address belonging to a copy destination block by simply changing the value of the 22nd bit from 0 to 1.

Referring to FIG. 21A, in the initial state of the status table unit 510 which the memory controller 602 includes, a status represented by logic value 0 representing "copy incomplete" is set for all physical block addresses 256 to 511 assigned to the nonvolatile memory unit 130.

In step S403 in FIG. 17, the CPU 601 boots the system from the bootup-memory-image stored in the nonvolatile memory unit 130. More specifically, the IPL 604 sets, in a program count in the CPU 201, the logical address of an instruction which is to be executed first when system operation is booted, and execution is booted from the instruction, thereby booting system operation (step S404).

Operation to be performed when a program running on the CPU 601 accesses the main memory device 101 at the stage of system operation (step S404) will be described next. Assume the following access:

(1) First write access to physical address having physical block address "400"
(2) Second or subsequent write access to physical address having physical block address "400"
(3) Read access to physical address having physical block address "256"
(4) Access to physical address having physical block address "1024"

Operation to be performed when the first access occurs to a physical address having physical block address "400" will be described first. In this case, the memory controller 602 searches the status table unit 510 with physical block address "400" and acquires an entry with "block address 400, status 0" in FIG. 21A (step S301). Since the search has succeeded, the memory controller 602 then discriminates that the current access is access to the nonvolatile memory unit 130 (YES in FIG. 302), and also discriminates that the status is "0" (copy incomplete) (YES in step S304).

The memory controller 602 then discriminates that the memory access is write access (YES in step S306), searches the protection information unit 540 with physical block address "400", and acquires an entry with "block address 400, protection attribute RW" (step S307). The memory controller 602 confirms that the acquired protection attribute is readable/writable (NO in step S308), and copies the block at physical block address "400" to the block at physical block address "912" in a reserved area of the main memory unit 120 (step S309).

As shown in FIG. 21B, the status corresponding to physical block address "400" in the status table unit 510 is updated from "0" to "1" (copy complete) (step S310). The memory controller 602 then translates the physical address by changing the value of the lower 22nd bit of the physical address associated with the current access from "0" to "1" (step S305). The memory controller 602 rewrites, using the data transferred from the program, the data copied to the block at physical block address "912" of the main memory unit 120 (step S303).

As described above, when the first write access occurs to a given block of the nonvolatile memory unit 130 in which the protection attribute is RW after the boot of system operation, the block is copied to the main memory unit 120, and updating is performed on the copy.

Operation to be performed when the second or subsequent write access occurs to the physical address having physical block address "400" will be described next. When the memory controller 602 searches the status table unit 510 with physical block address "400", since the status table unit 510 has been updated from the state in FIG. 21A to the state in FIG. 21B, the memory controller 602 acquires an entry with "block address 400, status 1" (step S301).

Since the search has succeeded, the memory controller 602 discriminates that the current access is access to the nonvolatile memory unit 130 (YES in step S302), and also discriminates that the status is "1" (copy complete) (YES in step S304). The memory controller 602 then translates the physical address by changing the value of the 22nd bit of the physical address associated with the current access from "0" to "1" (step S305). The memory controller 602 rewrites, using the data transferred from the program, the data copied to the block at physical block address "912" of the main memory unit 120 (step S303).

As described above, when the second or subsequent write access occurs to a given block of the nonvolatile memory unit 130 in which the protection attribute is RW after the boot of system operation, since copy operation like that for the first write access need not be performed anymore, the copy existing on the main memory unit 120 is immediately updated.

Operation to be performed when read access occurs to a logical address having logical block address "256" will be described next. The memory controller 602 searches the status table unit 510 with physical block address "256" and acquires an entry with "block address 256, status 0" in FIG. 21 (step S301). Since the search has succeeded, the memory controller 602 discriminates that the current access is access to the nonvolatile memory unit 130 (YES in step S302), and also discriminates that the status is 0 (copy incomplete) (YES in step S304). Since the memory access is read access (NO in step S306), the memory controller 602 accesses the nonvolatile memory unit 130 with the physical address having input physical block address "256" without performing physical address translation, and returns the read data to the program (step S303).

As described above, when read access is performed to the nonvolatile memory unit 130, data is directly read out from the nonvolatile memory unit 130.

Operation to be performed when access occurs to a physical address having physical block address "1024" will be described next. In this case, although the memory controller 602 searches the status table unit 510 with physical block address "1024", since the search fails, the memory controller 602 determines that the current access is access to a main memory area other than the nonvolatile memory unit 130 (NO in step S302), and accesses the main memory unit 120 with the physical address having input physical block address "1024" without performing physical address translation (step S303).

Fourth Embodiment

In the first to third embodiments described above, in order to change the bootup-memory-image used in the computer system, the nonvolatile memory unit 130 implemented in the computer system must be replaced with another nonvolatile memory unit which stores another bootup-memory-image or the bootup-memory-image stored in the nonvolatile memory unit 130 must be rewritten. In this embodiment, a plurality of nonvolatile memory units storing different bootup-memory-images are implemented in advance in the system. Therefore, selecting one of the nonvolatile memory units makes it possible to change the bootup-memory-image used at the time of bootup or reboot.

Figure 22:
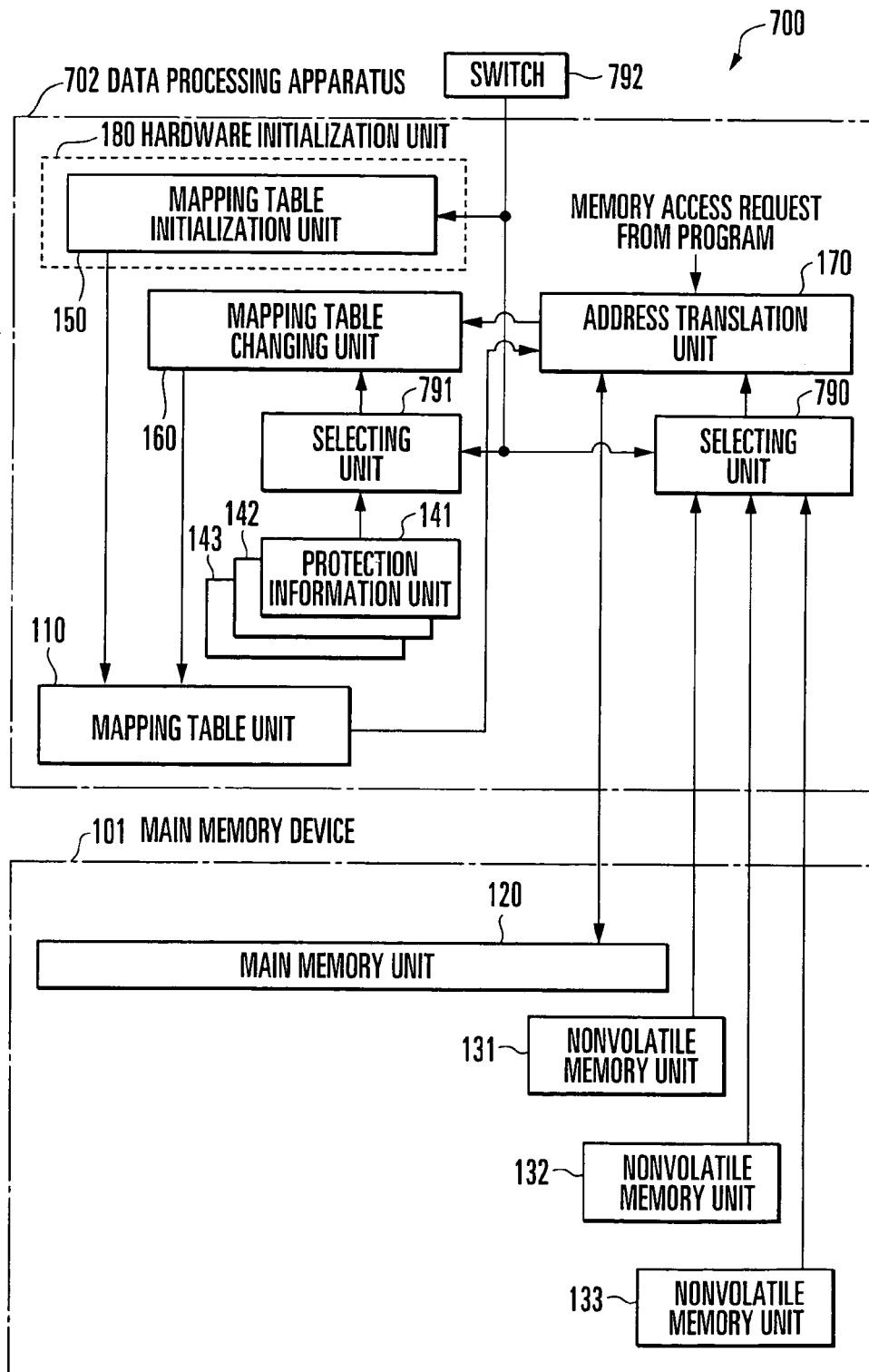
FIG. 22 is a block diagram showing the arrangement of a computer system according to the fourth embodiment of the present invention.

Referring to FIG. 22, a computer system 700 according to this embodiment differs from that according to the first embodiment shown in FIG. 1 in that a main memory device 101 comprises three nonvolatile memory units 131 to 133, and a data processing apparatus 702 comprises a selecting unit 790 which selects one of the three nonvolatile memory units 131 to 133, and a selecting unit 791 which selects one of three protection information units 141 to 143 corresponding to the nonvolatile memory units 131 to 133 in one-to-one correspondence, and a physical switch 792 which outputs nonvolatile memory unit selection information to a hardware initialization unit 180 and the selecting units 790 and 791. Although this embodiment includes the three nonvolatile memory units 131, 132, and 133, the number of nonvolatile memory units may be arbitrarily set as long as it is two or more.

Bootup-memory-images of an OS and application programs are stored in the nonvolatile memory units 131 to 133, respectively, and are different from each other. For this reason, the specifications of the computer system 700 vary depending on which nonvolatile memory unit is used.

Figure 23:
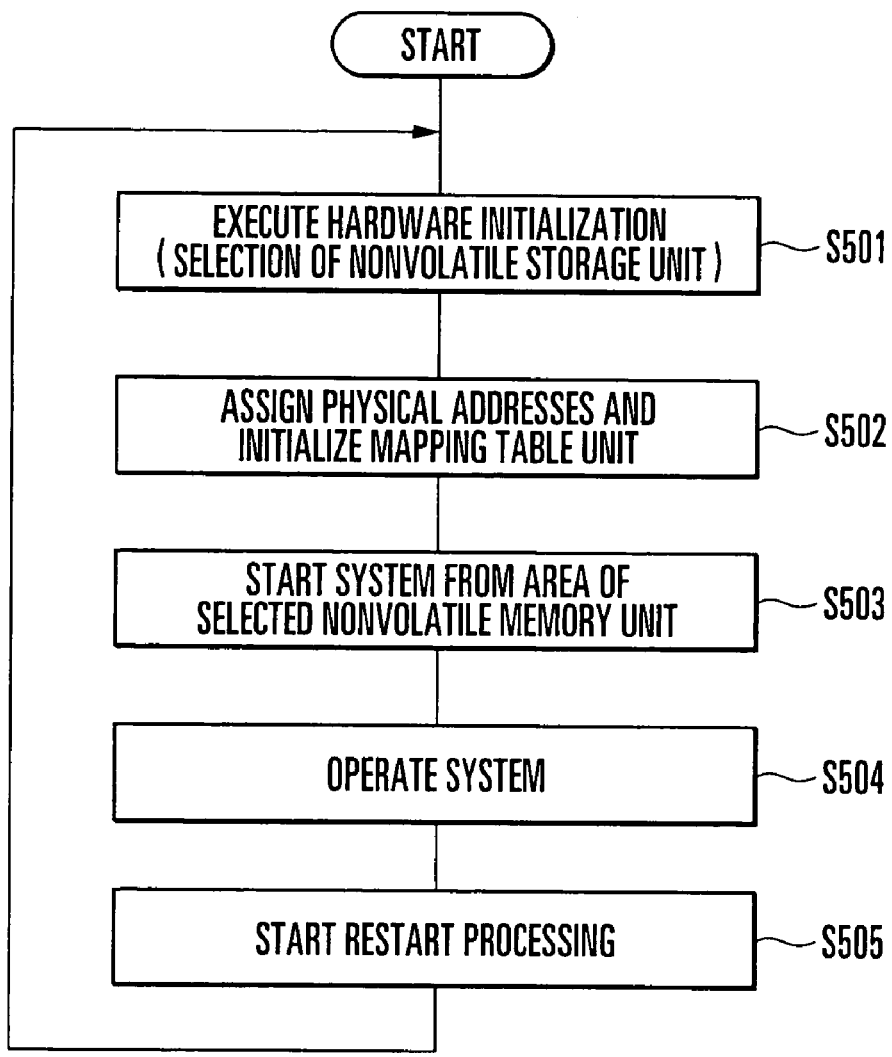
FIG. 23 is a flowchart showing the schematic operation of the computer system in FIG. 22.

The operation of the computer system 700 according to this embodiment will be described next with reference to FIG. 23. When the computer system 700 is booted, hardware initialization is executed by the hardware initialization unit 180 first as in the first embodiment. In this case, the selecting unit 790 selects one which is designated by the selection information output from the switch 792, and the selecting unit 791 selects one of the protection information units 141 to 143 which corresponds to the selected nonvolatile memory unit. In a following example, assume that the nonvolatile memory unit 131 and protection information unit 141 are selected.

A mapping table initialization unit 150 then assigns physical addresses to a main memory unit 120 and the selected nonvolatile memory unit 131 of the nonvolatile memory units 131 to 133 and initializes a mapping table unit 110 (step S502). In initialization of the mapping table unit 110, the correspondence between logical addresses and physical addresses is written in the mapping table unit 110, and all the blocks of the selected nonvolatile memory unit 131 are registered in the mapping table unit 110 in the read-only protection mode.

The data processing apparatus 702 boots the system from the bootup-memory-image stored in the selected nonvolatile memory unit 131 (step S503). Since this bootup-memory-image is in the same state as that immediately after bootup of the OS and the applications, the system returns to the environment set immediately after system bootup. At this time, there is no operation halt state between the instant at which the system is booted from the bootup-memory-image and the instant at which system operation is enabled (step S504).

When the first write access occurs from a program to a given block of the nonvolatile memory unit 131 at the stage of system operation (step S504), since the block is mapped in the read-only protection mode, the address translation unit 170 notifies a mapping table changing unit 160 of an exception event and temporarily suspends the write access. Upon reception of the exception event, the mapping table changing unit 160 determines the protection attribute of the block at the write occurrence logical address by referring to the protection information unit 141. If the attribute is a readable/writable attribute, the mapping table changing unit 160 assigns a free block having the same size as the block from the main memory unit 120, and copies the contents of the corresponding block of the nonvolatile memory unit 131 to the assigned block.

In addition, the mapping table changing unit 160 sets the assigned main memory block in the mapping table unit 110 such that the block is mapped to the write occurrence logical block address in the readable/writable protection mode, and reboots the temporarily suspended write access processing. As a result, the temporarily suspended write access and the subsequent write operation for the corresponding block are executed for the assigned main memory block. By reducing the block size makes it possible to shorten the copy time and system operation halt time.

When the system is rebooted in this state (step S505), hardware initialization processing is executed again (step S501). As in the case of bootup, the contents of the mapping table unit 110 are initialized by the operation of the mapping table initialization unit 150, and the nonvolatile memory unit 131 is mapped again (step S502). As a consequence, the system returns to the state wherein the results of all write operations performed for the main memory unit 120 during system operation are not reflected. That is, the system returns to the environment set immediately after bootup.

In the above embodiment, one of the nonvolatile memory units 131 to 133 is selected to be used under the control of the physical switch 792. However, this operation can be controlled by the flag set by the BIOS. Although physical addresses are assigned to only a selected one of a plurality of nonvolatile memory units, physical addresses may be assigned to all the nonvolatile memory units, or physical addresses may be statically assigned to all the nonvolatile memory units. If all the nonvolatile memory units can be used with the same protection attribute, one of the protection information units 141 to 143 may be used, and hence the selecting unit 791 can be omitted. Furthermore, changes corresponding to the differences between this embodiment and the first embodiment can be applied to the computer systems according to the second and third embodiments.

Fifth Embodiment

In the fourth embodiment, the bootup-memory-image to be used in the computer system can be changed by selecting one of a plurality of nonvolatile memory units. This method is suitable for greatly changing a bootup-memory-image. If, however, only a bootup-memory-image is to be changed to another image, since the bootup-memory-images in a plurality of nonvolatile memory units are mostly identical to each other, this method is wasteful. In this embodiment, only the bootup-memory-image stored in a nonvolatile memory unit is replaced with another image.

Referring to FIG. 24, a computer system 800 according to this embodiment differs from that according to the first embodiment shown in FIG. 1 in that a main memory device 101 comprises a first additional nonvolatile memory unit 135 and second additional nonvolatile memory unit 136 in addition to a nonvolatile memory unit 130 serving as a basic unit. Although this embodiment includes the two additional nonvolatile memory units 135 and 136, the number of nonvolatile memory units may be arbitrarily set as long as it is one or more.

Figure 25:
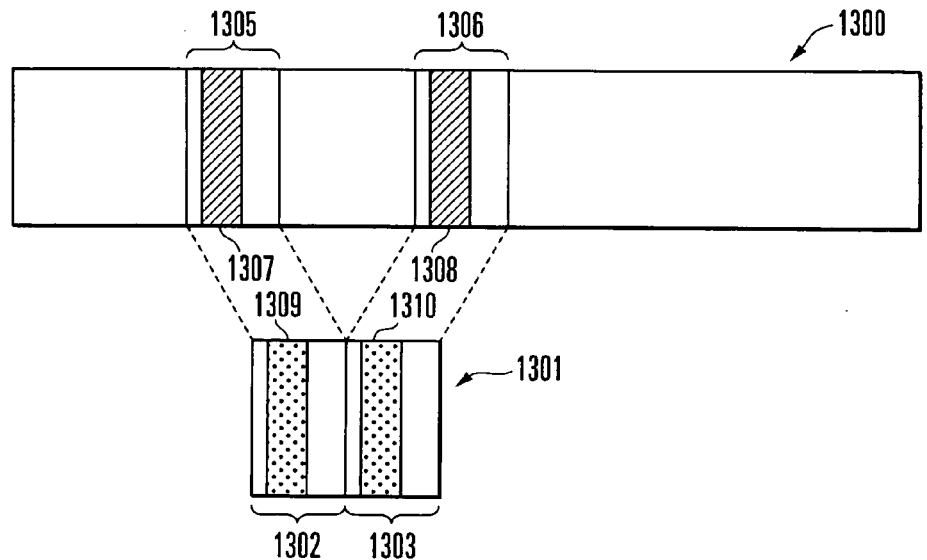
FIG. 25 is a view showing the relationship between the bootup-memory-image stored in a nonvolatile memory unit in FIG. 24 and the corrected images stored in additional nonvolatile memory units.

Corrected images of portions of a bootup-memory-image of an OS and application programs, which is stored in the nonvolatile memory unit 130, are stored in the additional nonvolatile memory units 135 and 136. Referring to FIG. 25, reference numeral 1300 denotes a bootup-memory-image stored in the nonvolatile memory unit 130; and 1301, a corrected image stored in the additional nonvolatile memory unit 135.

In this example, the corrected image 1301 is comprised of two blocks 1302 and 1303; the block 1302 corresponds to a block 1305 of the main stored image 1300, and the block 1303 corresponds to a block 1306 of the main stored image 1300. Hatched areas 1307 and 1308 in the blocks 1305 and 1306 are areas to be corrected. Dotted areas 1309 and 1310 in the blocks 1302 and 1303 of the corrected image 1301 are images which replace the images of the areas 1307 and 1308.

An arbitrary method can be used to create a corrected image to be stored in the additional nonvolatile memory unit 135. For example, a bootup-memory-image can be created by dumping the memory device immediately after the computer system with a first additional hardware is booted in a usual booted way. The dumped bootup-memory-image is compared with a bootup-memory-image immediately after a computer system without the first additional hardware and a second additional hardware is booted. As a result, a block having a different portion in its contents is extracted, thereby creating a corrected image. A corrected image to be stored in the additional nonvolatile memory unit 136 can be created as follow. A bootup-memory-image can be created by dumping the memory device immediately after a computer 900 with the first and second additional hardwares is booted in a usual bootup way. The dumped bootup-memory-image is compared with a bootup-memory-image immediately after a computer system with the first additional hardware and without the second additional hardware is booted. As a result, a block having a different portion in its contents is extracted.

In addition to the corrected images, physical block addresses to be assigned, the information of logical block addresses to be mapped, and an applicable addition order are stored for each block in the additional nonvolatile memory units 135 and 136. The applicable addition order is required to guarantee the applicable order of a plurality of nonvolatile memory units, and can be omitted if the same result can be obtained when nonvolatile memory units are applied in random order. As each of the additional nonvolatile memory units 135 and 136, an arbitrary type of memory can be used as long as it has nonvolatility like the nonvolatile memory unit 130. For example, a programmable nonvolatile memory such as a flash memory or a read-only nonvolatile memory such as a ROM can be used.

The operation of this embodiment will be described with reference to FIG. 26.

Figure 26:
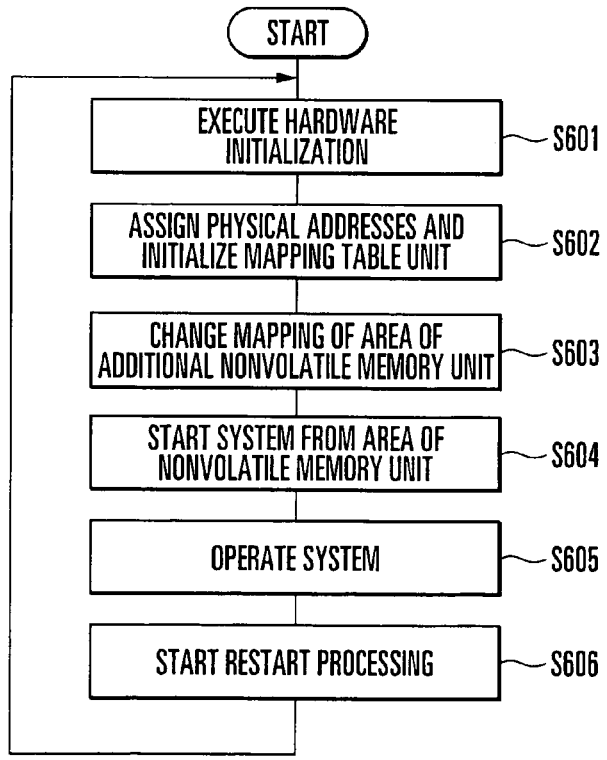
FIG. 26 is a flowchart showing the schematic arrangement of the computer system in FIG. 24.

As shown in FIG. 26, when the computer system 800 is booted, a hardware initialization unit 180 initializes the hardware first (step S601). A mapping table initialization unit 150 then assigns physical addresses to a main memory unit 120 and nonvolatile memory unit 130 and initializes the mapping table unit 110 (step S602). At the stage of checking the hardware upon hardware initialization, it is detected that the additional nonvolatile memory units 135 and 136 are implemented. In initialization of a mapping table unit 110, the correspondence between logical block addresses and physical block addresses is written in the mapping table unit 110, and all the blocks of the nonvolatile memory unit 130 are registered in the mapping table unit 110 in the read-only protection mode.

Subsequently, since the additional nonvolatile memory units 135 and 136 are implemented, the mapping table initialization unit 150 assigns physical addresses in accordance with the information of the physical block addresses written in the storage units, and changes the mapping of the mapping table unit 110 in accordance with the information of the logical addresses written in the storage units (step S603). That is, if the additional nonvolatile memory unit 135 and additional nonvolatile memory unit 136 are to be applied in this order according to the applicable addition order, some of the logical block addresses to which the nonvolatile memory unit 130 is mapped are replaced first with a portion of the first additional nonvolatile memory unit 135, and are then replaced with a portion of the second additional nonvolatile memory unit 136. In this case as well, the areas of the additional nonvolatile memory units 135 and 136 are registered in the mapping table unit 110 in the read-only protection mode.

A data processing apparatus 802 boots the system from the bootup-memory-image stored in the nonvolatile memory unit 130 (step S604). Since this bootup-memory-image is in the same state as that set immediately after the bootup of the OS and the applications, the system returns to the environment set immediately after bootup. At this time, there is no operation halt state between the instant at which the system is booted from the bootup-memory-image and the instant at which system operation is enabled (step S605).

When the program accesses the main memory device 101 at the stage of system operation (step S605), the processing shown in FIG. 4 is executed as in the first embodiment. When the first write access occurs from a program to a given block of the nonvolatile memory unit 130, the nonvolatile memory units 135 or 136, since the block is mapped in the read-only protection mode, the address translation unit 170 notifies a mapping table changing unit 160 of an exception event and temporarily suspends the write access (step S106 in FIG. 4).

Upon reception of the exception event, the mapping table changing unit 160 determines the protection attribute of the block at the write occurrence logical address by referring to a protection information unit 140 (step S108 in FIG. 4). If the attribute is a readable/writable attribute, the mapping table changing unit 160 assigns a free block having the same size as the block from the main memory unit 120, and copies the contents of the corresponding block of the nonvolatile memory unit 130, 135, or 136 (step S109 in FIG. 4). The mapping table changing unit 160 also sets the assigned main memory block in the mapping table unit 110 such that the block is mapped to the write occurrence logical block address in the readable/writable protection mode, and reboots the temporarily suspended write access processing (step S110 in FIG. 4).

As a result, the temporarily suspended write access and the subsequent write operation for the corresponding block are executed for the assigned main memory block. By reducing the block size makes it possible to shorten the copy time and system operation halt time.

When the system is rebooted in this state (step S606 in FIG. 26), hardware initialization processing is executed again (step S601). As in the case of bootup, the contents of the mapping table unit 110 are initialized by the operation of the mapping table initialization unit 150, and the nonvolatile memory unit 130 and the additional nonvolatile memory units 135 and 136 are mapped again (steps S602 and S603). As a consequence, the system returns to the state wherein the results of all write operations performed for the main memory unit 120 during system operation are not reflected. That is, the system returns to the environment set immediately after bootup.

This embodiment will be described in more detail next by giving an actual example.

Figure 27:
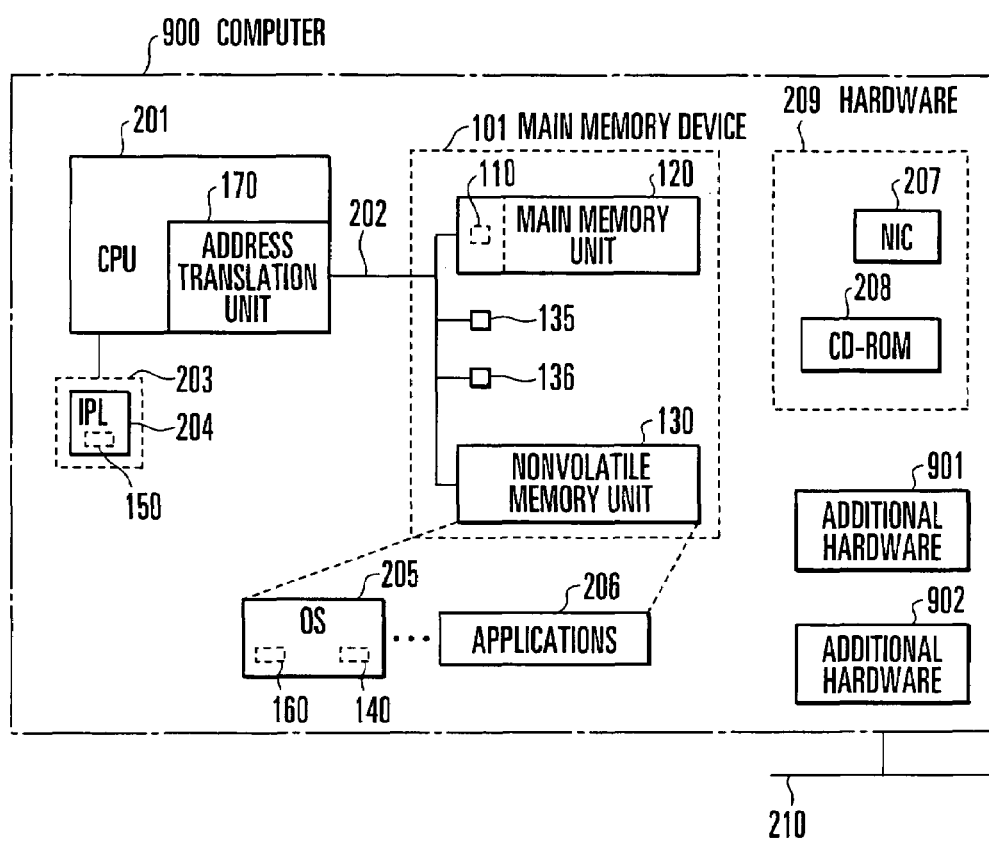
FIG. 27 is a block diagram showing an actual example of the computer system in FIG. 24.

The computer 900 in FIG. 27 is an example of the computer system to which this embodiment is applied. The computer 900 differs from the computer 200 shown in FIG. 6 in that the main memory device 101 the additional nonvolatile memory units 135 and 136 in addition to the main memory unit 120 and nonvolatile memory unit 130, and includes the additional hardware 901 and additional hardware 902 in addition to the hardware 209.

The additional hardware 901 and additional hardware 902 connected to the CPU 201 are hardware such as a network card, SCSI card, and sound card. The bootup-memory-image stored in the nonvolatile memory unit 130 is a bootup-memory-image created when the system has the same arrangement as that of the computer 200 in FIG. 6 to which the additional hardware 901 and additional hardware 902 are not added. When the additional hardware 901 is added to the system, the bootup-memory-image in the nonvolatile memory unit 130 must be partly corrected; a corrected part of the image after the correction is stored in the additional nonvolatile memory unit 135. Likewise, when the additional hardware 902 is added to the system, the bootup-memory-image in the nonvolatile memory unit 130 must further be corrected partly; a corrected part of the image after the correction is stored in the additional nonvolatile memory unit 136.

The operation of the computer 900 will be described below.

When the computer 900 is booted, hardware initialization, e.g., clearing the main memory unit 120 and initializing the hardware 209, additional hardware 901, and additional hardware 902, is executed in step S601 in FIG. 26. In hardware check accompanying this hardware initialization, information indicating that the additional nonvolatile memory units 135 and 136 are implemented, physical/logical assignment information held in the additional nonvolatile memory units 135 and 136, and applicable addition order information are read. Assume that the following physical/logical assignment information is held in the additional nonvolatile memory units 135 and 136.

Additional Nonvolatile Memory Unit 135
addition ordinal position: 1
first block: physical block address "20", logical block address "1"
second block: physical block address "21", logical block address "3"

Additional Nonvolatile Memory Unit 136
addition ordinal position: 2
first block: physical block address "30", logical block address "2"
second block: physical block address "31", logical block address "4"

In the above example, there are no redundant logical block addresses in the additional nonvolatile memory units 135 and 136. However, redundant logical block addresses may be occurred depending on the type of hardware to be added. In this case, the unit which is applied lastly is used.

Figure 28:
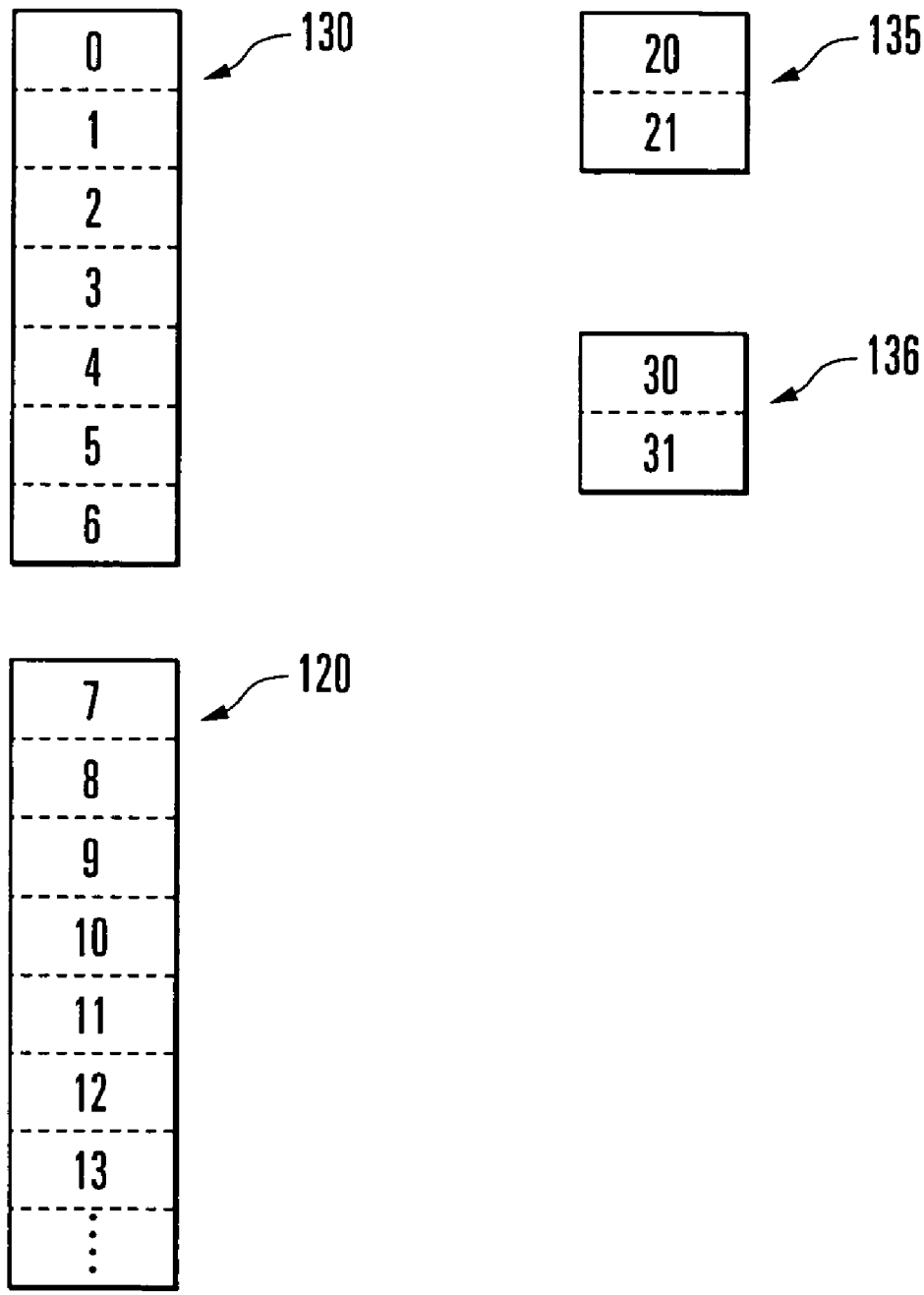
FIG. 28 is a view showing an example of the assignment of physical addresses used in the computer system in FIG. 27.

In step S602, the mapping table initialization unit 150 implemented in an IPL 204 assigns physical addresses to the main memory unit 120 and mapping table initialization unit 150, and initializes the mapping table unit 110, as shown in FIGS. 28 and 29A. In order to facilitate the understanding of the present invention, the numbers of blocks in an example of physical address assignment in FIG. 28 and an example of initialization of the mapping table unit 110 in FIG. 29A are set to be very small. In practice, however, many blocks exist.

Referring to FIG. 28, physical block addresses "0" to "6" are assigned to the respective blocks of the nonvolatile memory unit 130, and physical block addresses "7" to consecutive numbers are assigned to the respective blocks of the main memory unit 120. Referring to FIG. 29A, in the initial state of the mapping table unit 110 created in the main memory unit 120, physical block addresses "1" to "6" assigned to the nonvolatile memory unit 130 are associated with logical block addresses "0" to "5", and the protection modes of all the blocks are set to read-only (R). In addition, a predetermined physical block (the block at physical block address "7" in this example) of the main memory unit 120 is associated with logical block address "6", and the protection mode of the block is set to readable/writable (RW).

In this case, the block at physical block address "7" is a block in which the mapping table unit 110 is created.

In step S603 in FIG. 26, as shown in FIGS. 28 and 29B, physical addresses are assigned in accordance with the physical/logical assignment information written in the additional nonvolatile memory units 135 and 136, and the mapping of the mapping table unit 110 is changed in accordance with the information of the written logical address.

Referring to FIG. 28, physical block addresses "20" and "21" are assigned to two blocks of the first additional nonvolatile memory unit 135, and physical block addresses "30" and "31" are assigned to two blocks of the second additional nonvolatile memory unit 136.

Referring to FIG. 29B, physical block addresses "20" and "21" of the additional nonvolatile memory unit 135 are overwritten on logical block addresses "1" and "3", and physical block addresses "30" and "31" of the additional nonvolatile memory unit 136 are overwritten on logical block addresses "2" and "4".

In step S604 in FIG. 26, the CPU 201 boots execution from an instruction at a logical address which is to be executed first when the CPU 201 boots operation of the system, thus booting operation of the system. At the state of this system operation, when a program running on the CPU 201 accesses the main memory device 101, operation similar to that in the first embodiment is performed. For example, when the first write access occurs to a logical address having logical block address "3", the following operation is performed.

An address translation unit 170 searches the mapping table unit 110 with logical block address "3" and acquires an entry with "logical block address 3, physical block address 21, protection mode R" in FIG. 29B (step S101 in FIG. 4). Since the memory access is write access (YES in step S102) and the protection mode is read-only (step S105), the address translation unit 170 temporarily suspends the memory access processing and notifies the mapping table changing unit 160 of an exception event and boots exception processing (step S106).

The mapping table changing unit 160 searches a protection information unit 140 with logical block address "3". If the contents of the protection information unit 140 are the same as those shown in FIG. 7 as in the actual example of the first embodiment, the mapping table changing unit 160 acquires the protection attribute RW of an entry having logical block address "3" in FIG. 7 (step S107). Since the protection attribute RW is a readable/writable protection attribute (step S108), the mapping table changing unit 160 copies a block of the additional nonvolatile memory unit 135 which is specified by physical block address "21" to a free block (the block at physical block address 13, for example) of the main memory unit 120 (step S109). The mapping table changing unit 160 then rewrites the physical block address of the entry having logical block address "3" from "21" to "13", and also rewrites the protection mode from R to RW (step S110). The mapping table changing unit 160 then notifies the address translation unit 170 of the completion of the exception processing.

Upon reception of the completion of the exception processing from the mapping table changing unit 160, the address translation unit 170 reboots the temporarily suspended memory access processing from step S101. When searching the mapping table unit 110 with logical block address "3", since the mapping table unit 110 has been updated from the state in FIG. 29B to the state in FIG. 30A, the address translation unit 170 acquires an entry with "logical block address 3, physical block address 13, protection mode RW" (step S101).

Since the memory access designated by the program is write access (YES in step S102) and the protection mode is RW (NO in step S105), the address translation unit 170 translates the logical address designated by the program into a physical address by using physical block address "13" in the acquired entry (step S103), accesses the main memory device 101 which is specified by the physical address, and writes the data transferred from the program (step S104).

Likewise, when the first write access occurs to a logical address having logical block address "5", the mapping table unit 110 is updated as shown in FIG. 30B. In this example, an assigned free block has physical address of "12".

As described above, in this embodiment as in the actual example of the first embodiment, when the first write access occurs to a given block of the nonvolatile memory unit 130 which has the protection attribute RW after the boot of system operation, the block is copied to the main memory unit 120, and updating is performed on the copy.

Note that changes corresponding to the differences between this example and the first embodiment can be applied to the computer systems according to the second and third embodiments.

The first effect of the present invention is that the computer system can be booted quickly for the following reason. Since the system is booted from the bootup-memory-image stored in the nonvolatile memory unit, and data that must be rewritten by an OS or application programs is copied every time write access occurs to the nonvolatile memory unit instead of being continuously copied from the nonvolatile memory unit to a readable/writable alternative storage unit at the time of system bootup, memory copy does not continuously occur at the time of bootup.

The second effect of the present invention is that the main memory is not wastefully used. This is because read-only data is directly loaded from the nonvolatile memory unit without being copied to the main memory. In addition, since read-only data is not copied, the copy time can be shortened as compared with the case wherein all the contents of the nonvolatile memory unit are copied.

What is claimed is:

1. A computer system which boots said system from a bootup-memory-image, after initialization procession of an operating system (OS) and application programs, stored in a nonvolatile memory unit forming part of a main memory device, when first write access occurs after system operations, copies data from a block of the bootup-memory-image after intialization processing of an OS and application programs to a readable/writable main memory unit forming another part of the main memory device for each block of the bootup-memory-image, performs write operation on the copy of the block of the bootup-memory-image, and subsequently switches access to a block of the bootup-memory-image to which data has already been copied to access the copy.

2. A computer system comprising:
a main memory device which comprises a nonvolatile memory unit which stores a bootup-memory-image, after initialization processing of an operating system (OS) and application program, and a readable/writable main memory unit; and
a data processing apparatus which boots said system from the bootup-memory-image stored in the nonvolatile memory unit, and every time write access occurs from the OS or application program to the nonvolatile memory unit during system operation, copies data within an address range with a predetermined width which includes an address at which write access has occurred from the nonvolatile memory unit to an alternative area ensured in the main memory unit, and performs setting to translate subsequent access to the address range with the predetermined width into access to the alternative area.

3. A system according to claim 2, wherein said data processing apparatus reads out data from the nonvolatile memory unit when read access to the nonvolatile memory unit occurs from the OS or application program during system operation.

4. A computer system comprising:
a main memory device which comprises a nonvolatile memory unit which stores a bootup-memory-image, after intialization processing of an operating system (OS) and application program, and a readable/writable main memory unit;
a data processing apparatus which boots said system from the bootup-memory-image stored in the nonvolatile memory unit, and every time write access occurs from the OS or application program to the nonvolatile memory unit during system operation, copies data within an address range with a predetermined width which includes an address at which write access has occurred from the nonvolatile memory unit to an alternative area ensured in the main memory unit, and performs setting to translate subsequent access to the address range with the predetermined width into acess to the alternative area, wherein said data processing apparatus reads out data from the nonvolatile memory unit when read access to the nonvolatile memory unit occurs from the OS or application program during system operation; and
a protection information unit which stores a protection attribute for each address range having a predetermined width and including addresses to be designated when the OS and the application program access said main memory device,
wherein said data processing apparatus refers to said protection information unit for a protection attribute of the address range having the predetermined width and including an address at which the write access has occurred, performs the copy operation and the setting only when the protection attribute is readable/writable, and determines an error when the protection attribute is read only.

5. A system according to claim 4, further comprising other nonvolatile memory units which store a main storage bootup-memory-image different from the main storage bootup-memory-image stored in the nonvolatile memory unit, and
a selecting unit which selects the nonvolatile memory unit and any one of said other nonvolatile memory units at the time of bootup.

6. A system according to claim 4, further comprising not less than one additional nonvolatile memory unit which stores a corrected image of a portion of the main storage bootup-memory-image stored in the nonvolatile memory unit, and
re-mapping means for remapping a physical address mapped to an area corresponding to the corrected image of the bootup-memory-image which is stored in said additional nonvolatile memory unit to a physical address mapped to the corrected image in said additional nonvolatile memory unit.

7. A system according to claim 4, wherein the nonvolatile memory unit comprises a read only storage device.

8. A system according to claim 4, wherein the nonvolatile memory unit comprises a readable/writable storage device.

9. A computer system comprising:
a main memory device which comprises at least one nonvolatile memory unit which stores a bootup-memory-image, after initialization processing of an operating system (OS), and an application program, and a readable/writable main memory unit; and
a data processing apparatus which boots said system from the main storage bootup-memory-image stored in the nonvolatile memory unit,
said data processing apparatus comprising access processing means for, when write access occurs from the OS or the application program to said main memory device during system operation, if there is no violation against a protection mode set in a mapping table in which mapping information of physical block addresses of the nonvolatile memory unit and a read only pseudo-protection mode are initially set to logical block addresses of said system, accessing the main memory unit of said main memory device upon translating a logical address into a physical address in accordance with mapping information set in the mapping table, and if there is a violation against the protection mode, copying data in a block including an address at which write access has occurred from the nonvolatile memory unit to an alternative area ensured in the main memory unit only when a readable/writable attribute is determined upon referring to a protection information unit holding an intrinsic protection attribute of an access destination logical block, and processing the write access again upon updating the mapping table such that a block address of the alternative area is mapped to the access destination logical block and a protection mode coincides with the intrinsic protection attribute.

10. A system according to claim 9, wherein said data processing apparatus comprises mapping table initialization means for creating at the time of system bootup a mapping table in which mapping information of physical block addresses of the nonvolatile memory unit and a read only pseudo protection mode are set for logical block addresses of said system.

11. A computer system comprising:
a main memory device which comprises a nonvolatile memory unit which stores a main storage bootup-memory-image, after initialization processing of an operating system (OS) and an application program, and a readable/writable main memory unit; and
a data processing apparatus which boots said system from the main storage bootup-memory-image stored in the nonvolatile memory unit,
said data processing apparatus comprising
status table initialization means for creating at the time of system bootup a status table in which a status indicating copy incomplete is set for each physical block address of the nonvolatile memory unit, and
a memory access unit which, when write access occurs from the OS or the application program to the nonvolatile memory unit during system operation and a status set in the status table indicates copy incomplete, copies data in a write destination physical block from the nonvolatile memory unit to an alternative block reserved in advance in the main memory unit only when a readable/writable attribute is determined upon referring to a protection information unit holding an intrinsic protection attribute of an access destination physical block, accesses the alternative block with a physical address obtained by changing a block address of a physical address for the write access into a block address of the alternative block upon updating a status in the mapping table to indicate that copying of the access destination physical block is complete, and when write access occurs from the OS or the application program to the nonvolatile memory unit during system operation and a status set in the status table indicates copy complete, accesses the alternative block with a physical address obtained by changing a block address of a physical address for the write access into a block address of the alternative block.

12. A system according to claim 10, wherein
said main memory device comprises a plurality of nonvolatile memory units including the nonvolatile memory unit, which store different main storage bootup-memory-images of after initialization processing of the OS and the application program,
said data processing apparatus comprises selection means for selecting one of the plurality of nonvolatile memory units at the time of system bootup, and
the mapping table initialization means creates at the time of system bootup a mapping table in which mapping information of physical block addresses of the selected nonvolatile memory unit and a read only pseudo protection mode for logical block addresses of said system are set.

13. A system according to claim 10, wherein the mapping table initialization means re maps at the time of system bootup a physical block address mapped to an area corresponding to a corrected image of the main storage bootup-memory-image which is stored in the additional nonvolatile memory unit to a physical address mapped to the corrected image in the additional nonvolatile memory unit.

14. A computer system startbootup method comprising the steps of:
booting the system from a main storage bootup-memory-image, after intialization processing of an operating system (OS) and an application program, which is stored in a nonvolatile memory unit forming part of a main memory device;
when first write access occurs after system operation, copying, for each area of the main storage bootup-memory-image after intialization processing of an OS and application programs which has a predetermined width, data of the area to a readable/writable main memory unit forming another part of the main memory device and performing write operation on the copy of the block of the bootup-memory-image; and
subsequently switching access to an area of the main storage bootup-memory-image to which data has already been copied to access the copy.

15. A computer system bootup method for a computer system comprising the steps of:
booting the system from a main storage bootup-memory-image, after initialization processing of an operating system (OS) and an application program, which is stored in a nonvolatile memory unit of a main memory device which comprises the nonvolatile memory unit which stores the bootup-memory-image and a readable/writable main memory unit; and
every time write access occurs from the OS or application program to the nonvolatile memory unit during system operation, copying, from the nonvolatile memory unit to an alternative area ensured in the main memory unit, data within an address range with a predetermined width which includes an address at which write access has occurred, and performing setting to translate subsequent access to the address range with the predetermined width into access to the alternative area.

16. A method according to claim 15, further comprising the step of reading out data from the nonvolatile memory unit when read access to the nonvolatile memory unit occurs from the OS or application program during system operation.

17. A computer system bootup method comprising the steps of:
  booting the system from a main storage bootup-memory-image, after intialization processing of an operating system (OS) and an application program, wich is stored in a nonvolatile memory unit of a main memory device which comprises the nonvolatile memory unit which stores the bootup-memory-image and a readable/writable main memory unit;
  every time write access occurs from the OS or application program to the nonvolatile memory unit during system operation, copying, from the nonvolatile memory unit to an alternative area ensured in the main memory unit, data within an address at which write access has occurred, and performing setting to translate subsequent access to the address range with the predetermined width into access to the alternative area;
  reading out data from the nonvolatile memory unit when read access to the nonvolatile memory unit occurs from the OS or application program during system operation;
  referring to a protection attribute of an address range having a predetermined width and including an address at which the write access has occurred from a protection information unit which stores a protection attribute for each address range having the predetermined width and including addresses to be designated when the OS and the application program access the main memory device, and
  performing the copy operation and the setting only when the protection attribute is readable/writable, and determining an error when the protection attribute is read only.

18. A method according to claim 17, wherein other nonvolatile memory units which store a main storage bootup-memory-image different from the main storage bootup-memory-image stored in the nonvolatile memory unit is provided, and
  the step of booting comprises the step of selecting the nonvolatile memory unit and any one of the other nonvolatile memory units at the time of bootup.

19. A method according to claim 17, wherein
  not less than one additional nonvolatile memory unit which stores a corrected image of a portion of the bootup-memory-image stored in the nonvolatile memory unit is provided, and
  the method further comprises the step of re-mapping a physical address mapped to an area corresponding to the corrected image of the bootup-memory-image which is stored in the additional nonvolatile memory unit to a physical address mapped to the corrected image in the additional nonvolatile memory unit.

20. A recording medium storing a bootup program for a computer system which comprises
  a main memory device which comprises at least one nonvolatile memory unit which stores a bootup-memory-image after, initialization processing of an operating system (OS) and an application program, and a readable/writable main memory unit; and
  a data processing apparatus which boots the system from the bootup-memory-image stored in the nonvolatile memory unit,
  the bootup program comprising a program, in the data processing apparatus, which implements an access processing sequence of, when write access occurs from the OS or the application program to the main memory device during system operation, if there is no violation against a protection mode set in a mapping table in which mapping information of physical block addresses of the nonvolatile memory unit and a read only pseudo protection mode are initially set to logical block addresses of the system, accessing the main memory unit of the main memory device upon translating a logical address into a physical address in accordance with mapping information set in the mapping table, and if there is a violation against the protection mode, copying data in a block including an address at which write access has occurred from the nonvolatile memory unit to an alternative area ensured in the main memory unit only when a readable/writable attribute is determined upon referring to a protection information unit holding an intrinsic protection attribute of an access destination logical block, and processing the write access again upon updating the mapping table such that a block address of the alternative area is mapped to the access destination logical block and a protection mode coincides with the intrinsic protection attribute.

21. A medium according to claim 20, wherein the bootup program comprises a program, in the data processing apparatus, which implements a mapping table initialization sequence of creating at the time of system bootup a mapping table in which mapping information of physical block addresses of the nonvolatile memory unit and a read only pseudo protection mode are set for logical block addresses of the system.

22. A recording medium storing a startbootup program for a computer system including
  a main memory device which comprises a nonvolatile memory unit which stores a bootup-memory-image after initialization processing of an operating system (OS) and an application program, and a readable/writable main memory unit, and
  a data processing apparatus which boots the system from the bootup-memory-image stored in the nonvolatile memory unit,
  the bootup program comprising a program, in the data processing apparatus, which implements a status table initialization sequence of creating at the time of system bootup a status table in which a status indicating copy incomplete to for each physical block address of the nonvolatile memory unit, and
  a program which implements a memory access sequence of, when write access occurs from the OS or the application program to the nonvolatile memory unit during system operation and a status set in the status table indicates copy incomplete, copying data in a write destination physical block from the nonvolatile memory unit to an alternative block reserved in advance in the main memory unit only when a readable/writable attribute is determined upon referring to a protection information unit holding an intrinsic protection attribute of an access destination physical block, accessing the alterative block with a physical address obtained by changing a block address of a physical address for the write access into a block address of the alternative block upon updating a status in the mapping table to indicate that copying of the access destination physical block is complete, and when write access occurs from the OS or the application program to the nonvolatile memory unit during system operation and a status set in the status table indicates copy complete, accessing the alternative block with a physical address obtained by changing a block address of a physical address for the write access into a block address of the alternative block.

23. A medium according to claim 21, wherein the main memory device comprises a plurality of nonvolatile memory units including the nonvolatile memory unit, which store different main storage bootup-memory-images of after initialization processing of the OS and the application program, the bootup program comprises a program which implements a sequence of causing the data processing apparatus to select one of the plurality of nonvolatile memory units at the time of system bootup, and the program which implements the mapping table initialization sequence comprises a program which implements a sequence of creating at the time of system bootup a mapping table in which mapping information of physical block addresses of the selected nonvolatile memory unit and a read only pseudo protection mode for logical block addresses of the system are set.

24. A medium according to claim 21, wherein the program which implements the mapping table initialization sequence comprises a program which implements a sequence of re mapping at the time of system bootup a physical block address mapped to an area corresponding to a corrected image of the bootup-memory-image which is stored in the additional nonvolatile memory unit to a physical address mapped to the corrected image in the additional nonvolatile memory unit.

* * * * *